United States Patent
Bogineni et al.

(10) Patent No.: US 12,538,128 B2
(45) Date of Patent: Jan. 27, 2026

(54) SYSTEMS AND METHODS FOR PROTECTING ACCOUNT INFORMATION ASSOCIATED WITH A STOLEN MOBILE DEVICE

(71) Applicant: Verizon Patent and Licensing Inc., Basking Ridge, NJ (US)

(72) Inventors: Kalyani Bogineni, Irving, TX (US); Ratul K. Guha, Warwick, PA (US); Shanthala Kuravangi-Thammaiah, Keller, TX (US); Dante J. Pacella, Charles Town, WV (US); Ye Huang, San Ramon, CA (US); Burhan Syed, Bridgewater, NJ (US); Kevin Lim, Danville, CA (US); Vassilis Pafilis, Plano, TX (US); Ashish Sardesai, Ashburn, VA (US); Chris Halton, Park Ridge, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 18/460,943

(22) Filed: Sep. 5, 2023

(65) Prior Publication Data
US 2025/0080986 A1    Mar. 6, 2025

(51) Int. Cl.
*H04W 12/041*    (2021.01)
*H04W 12/122*    (2021.01)
*H04W 12/69*    (2021.01)

(52) U.S. Cl.
CPC ......... *H04W 12/122* (2021.01); *H04W 12/69* (2021.01)

(58) Field of Classification Search
CPC ..... H04W 76/10; H04W 4/24; H04W 12/122; H04W 12/69; H04W 4/16; H04M 15/41; H04L 69/08; G06F 12/0811; G06F 11/1435; G06F 21/62
See application file for complete search history.

(56) References Cited

U.S. PATENT DOCUMENTS

2013/0212195 A1 * 8/2013 Bonefas ................. H04L 67/63
                                                              709/206
2015/0358790 A1 * 12/2015 Nasserbakht ........... G06F 21/32
                                                              726/19

OTHER PUBLICATIONS

5G; 5G System; Equipment Identity Register Services; Stage 3, (3GPP TS 29.511 version 16.2.0 Release 16), ETSI TS 129 511 V16.2.0, Jul. 2020, 20 Pages.

* cited by examiner

Primary Examiner — Phuoc H Doan

(57) ABSTRACT

A device of network may provide, to a secondary device, an identifier of a user equipment and a code for messaging, and may receive, from the secondary device and based on the code, target data identifying a target application to notify when the user equipment is stolen. The device may receive an indication of theft of the user equipment, and may block access of the identifier of the user equipment to the target application based on the indication.

20 Claims, 16 Drawing Sheets

US 12,538,128 B2

SYSTEMS AND METHODS FOR PROTECTING ACCOUNT INFORMATION ASSOCIATED WITH A STOLEN MOBILE DEVICE

BACKGROUND

Theft and/or loss of mobile devices (e.g., a user equipment (UE)) has been increasing. Stolen UEs may enable bad actors with illegal access to financial account information and/or user data via financial mobile applications on the stolen or lost UEs.

DETAILED DESCRIPTION OF EXAMPLE EMBODIMENTS

Figure 1A:
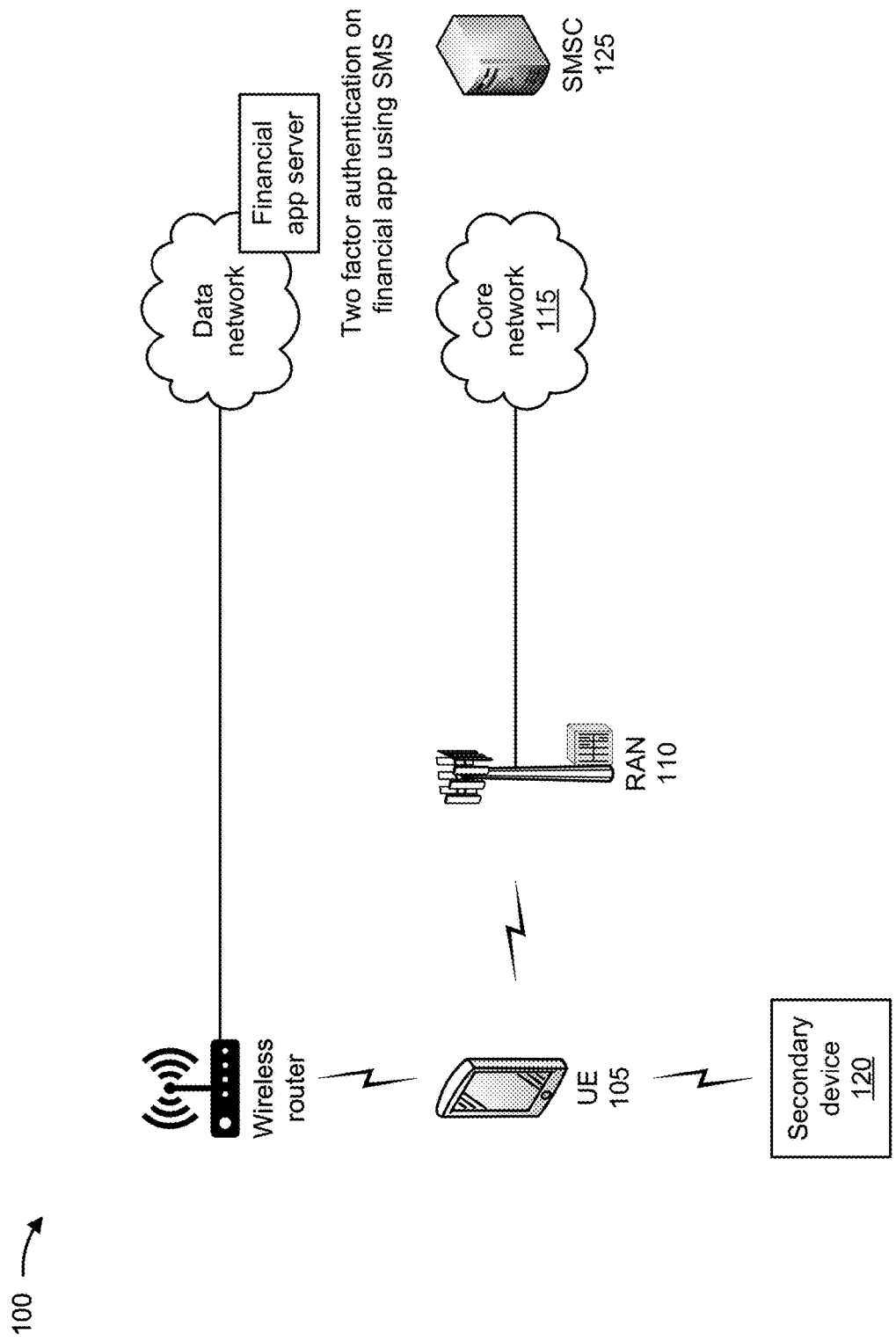
FIGS. 1A-1F are diagrams of an example associated with protecting account information associated with a stolen user equipment (UE).

The following detailed description of example implementations refers to the accompanying drawings. The same reference numbers in different drawings may identify the same or similar elements.

User equipments (UEs) (e.g., mobile devices) are hubs of user data and applications. If a UE is stolen and compromised (e.g., a thief is able to retrieve a password for the UE or otherwise gain access to the UE via secret phrase or code, such as a PIN or a passcode), the thief may swiftly be able to steal financial information or other sensitive data from an owner of the UE before the owner can act to prevent the theft by contacting their service provider. However, current procedures for handling lost or stolen UEs are slow and fail to adequately protect account information from theft. Further, with high profile data theft, law enforcement may wish to monitor activity of a stolen UE and understand a severity of the data theft without spooking the bad actor and/or to facilitate recovery of the stolen UE. Thus, current procedures for protecting account information in a stolen or lost UE consume computing resources (e.g., processing resources, memory resources, communication resources, and/or the like), networking resources, and/or other resources associated with failing to protect account information associated with a stolen or lost UE, handling the repercussions associated with theft of the account information, providing a poor user experience for a user of the stolen or lost UE, involving law enforcement and/or financial institutions in attempting to identify a bad actor associated with the stolen or lost UE, and/or the like.

Some implementations described herein provide a device that protects account information associated with a stolen UE. For example, a device may provide, to a secondary device, an identifier of a UE and a code for messaging, and may receive, from the secondary device and based on the code, target data identifying a target application to notify when the UE is stolen. The device may receive an indication of theft of the UE, and may block access of the identifier of the UE to the target application based on the indication. In some implementations, the device may receive user configuration data identifying an address of the UE and a pairing of the UE and the secondary device, and may receive network data and external data associated with the UE. The device may utilize the user configuration data, the network data, and the external data to determine safe geolocation zones and unsafe geolocation zones for the UE, and may utilize the user configuration data, the network data, and the external data to configure a time interval to check a proximity of the UE and the secondary device based on the safe geolocation zones and the unsafe geolocation zones. The device may check the proximity of the UE and the secondary device based on the time interval, and may determine, based on the proximity, whether the UE and the secondary device are separated.

In this way, the device protects account information associated with a stolen UE. For example, the device may enable remote locking or disabling of a lost or stolen UE based on an input received from a secondary device (e.g., an Internet of Things (IoT) device, a fob, and/or the like) associated with the UE. The device may block short message service (SMS) features of the lost or stolen UE to prevent two factor authentication by the UE for accessing applications on the UE. Thus, the device may conserve computing resources, networking resources, and/or other resources that would have otherwise been consumed by failing to protect account information associated with a stolen or lost UE, handling the repercussions associated with theft of the account information, providing a poor user experience for a user of the stolen or lost UE, involving law enforcement and/or financial institutions in attempting to identify a bad actor associated with the stolen or lost UE, and/or the like.

FIGS. 1A-1F are diagrams of an example 100 associated with protecting account information associated with a stolen UE. As shown in FIGS. 1A-1F, example 100 includes a UE 105, a radio access network (RAN) 110, a core network 115, a secondary device 120, a short message service center (SMSC) 125, a wireless router, and a data network associated with a financial application server. Further details of the UE 105, the RAN 110, the core network 115, the secondary device 120, the SMSC 125, the wireless router, the data network, and the financial application server are provided elsewhere herein.

As shown in FIG. 1A, the UE 105 may wirelessly connect with the RAN 110, the secondary device 120, and the wireless router. The RAN 110 may enable the UE 105 to communicate with the core network 115 and/or the SMSC 125. In some implementations, the RAN 110 may enable the UE 105 to communicate with the data network and/or the financial application server. The secondary device 120 may include a remote device, such as an IoT device, a key fob, a category M1 device, a smart watch, a ring, jewelry, a near-field communication (NFC) card or tag, and/or the like, that is capable of communicating with the UE 105 and/or the core network 115. The wireless router may enable the UE 105 to communicate with the data network and/or the financial application server.

Figure 1B:
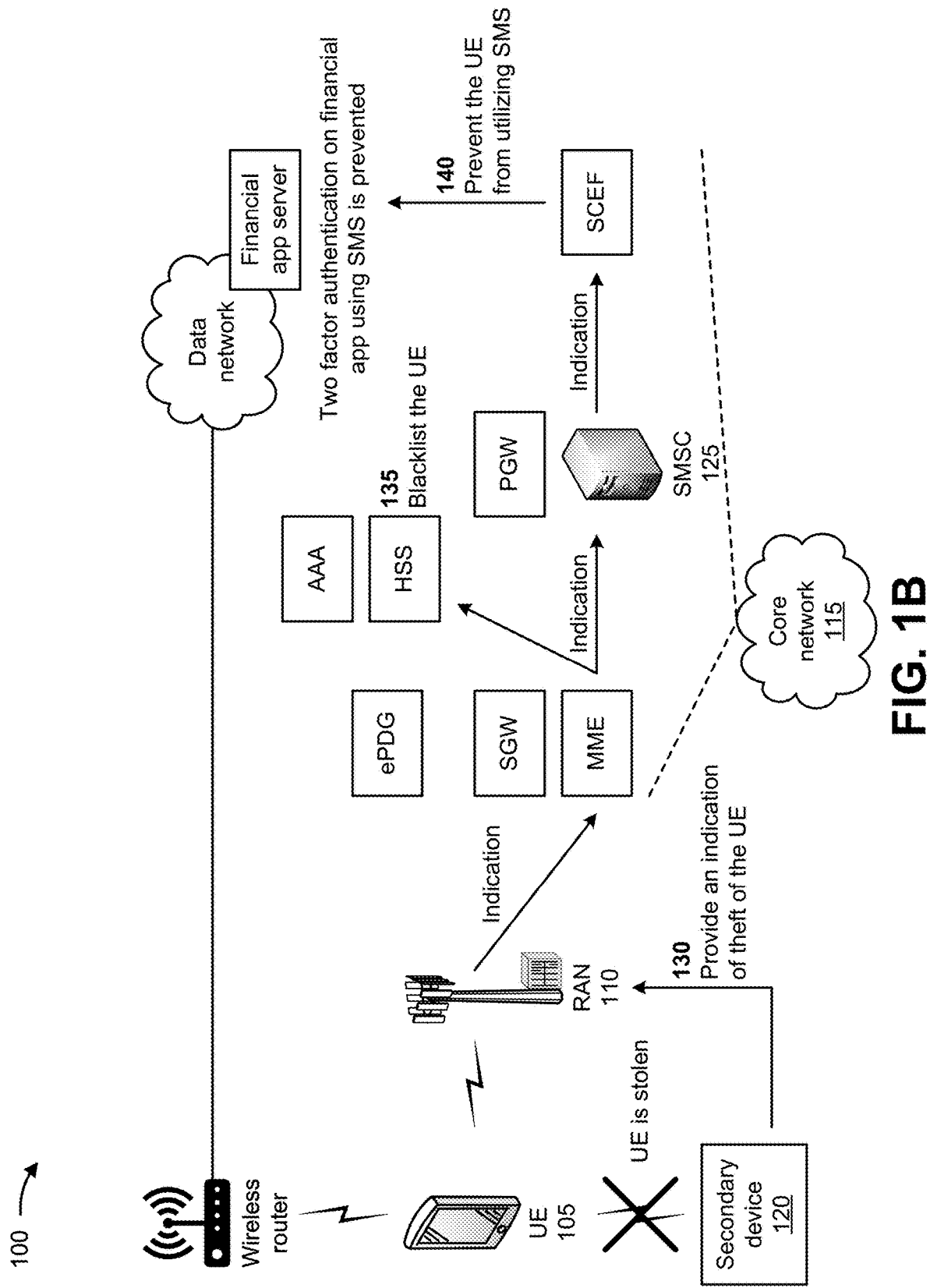

As shown in FIG. 1B, the core network 115 may include a mobility management entity (MME), a serving gateway (SGW), a packet data network gateway (PGW), a service capability exposure function (SCEF), an evolved packet data gateway (ePDG), an authentication, authorization, and accounting (AAA) component, and a home subscriber server (HSS). As further shown in FIG. 1B, the UE 105 may be stolen (or lost) and may lose connectivity with the secondary device 120. For example, a user of the UE 105 may have the UE 105 stolen or may lose the UE 105.

As further shown in FIG. 1B, and by reference number 130, the secondary device 120 may provide an indication of theft of the UE 105 to the RAN 110. For example, when the user of the UE 105 realizes that the UE 105 is stolen (or lost), the user may utilize the secondary device 120 to generate the indication of theft of the UE 105. In some implementations, the user may actuate a button of the secondary device 120 and actuation of the button of the secondary device 120 may cause the secondary device 120 to generate the indication of theft of the UE 105. Alternatively, or additionally, when a location of the UE 105 is a predetermined distance from a location of the secondary device 120, the secondary device 120 may generate the indication of theft of the UE 105. Further details associated with determining whether the location of the UE 105 is the predetermined distance from the location of the secondary device 120 are provided below in connection with FIGS. 3A-3E. In some implementations, the secondary device 120 may provide the indication of theft of the UE 105 to the RAN 110, and the RAN 110 may receive the indication from the secondary device 120.

As further shown in FIG. 1B, and by reference number 135, the HSS may blacklist the UE 105 based on the indication. For example, the RAN 110 may provide the indication of theft of the UE 105 to the core network 115 (e.g., to the MME of the core network 115). The MME may provide the indication of theft of the UE 105 to the HSS and to the SCEF. The SCEF may provide the indication of the theft of the UE 105 to the SMSC 125. In some implementations, the HSS may receive the indication of theft of the UE 105 from the MME, and may blacklist the UE 105 based on the indication. For example, the HSS may maintain a blacklist of UEs 105 (e.g., of identifiers associated with UEs 105) that are blacklisted from the core network 115 (e.g., deregistered from the core network 115 with no service) due to theft, fraud, loss, and/or the like. The HSS may add an identifier of the UE 105 to the blacklist based on receiving the indication of theft of the UE 105.

As further shown in FIG. 1B, and by reference number 140, the SMSC 125 may prevent the UE 105 from utilizing SMS for accessing the financial application server. For example, the SMSC 125 may receive the indication of theft of the UE 105 from the MME, and may interact with the SCEF (e.g., provide the indication to the SCEF) to prevent the UE 105 from utilizing SMS for accessing the financial application server based on the indication of theft of the UE 105. The SCEF may interact with the financial application server before the SMS is disabled for the UE 105. In some implementations, the financial application server may require two factor authentication (e.g., via SMS) to access and utilize the financial application provided by the financial application server. The SMSC 125 may provide SMS to the UE 105 and may prevent the UE 105 from utilizing SMS for two factor authentication. Thus, the UE 105 may be unable to access and utilize the financial application. In some implementations, the UE 105 may be unable to access the financial application based on interdicting MFA proxy protection and holding SMS-delivered codes or network addresses until verifying the user, or based on redirecting all SMS messages to an alternative number designated by the user.

Figure 1C:
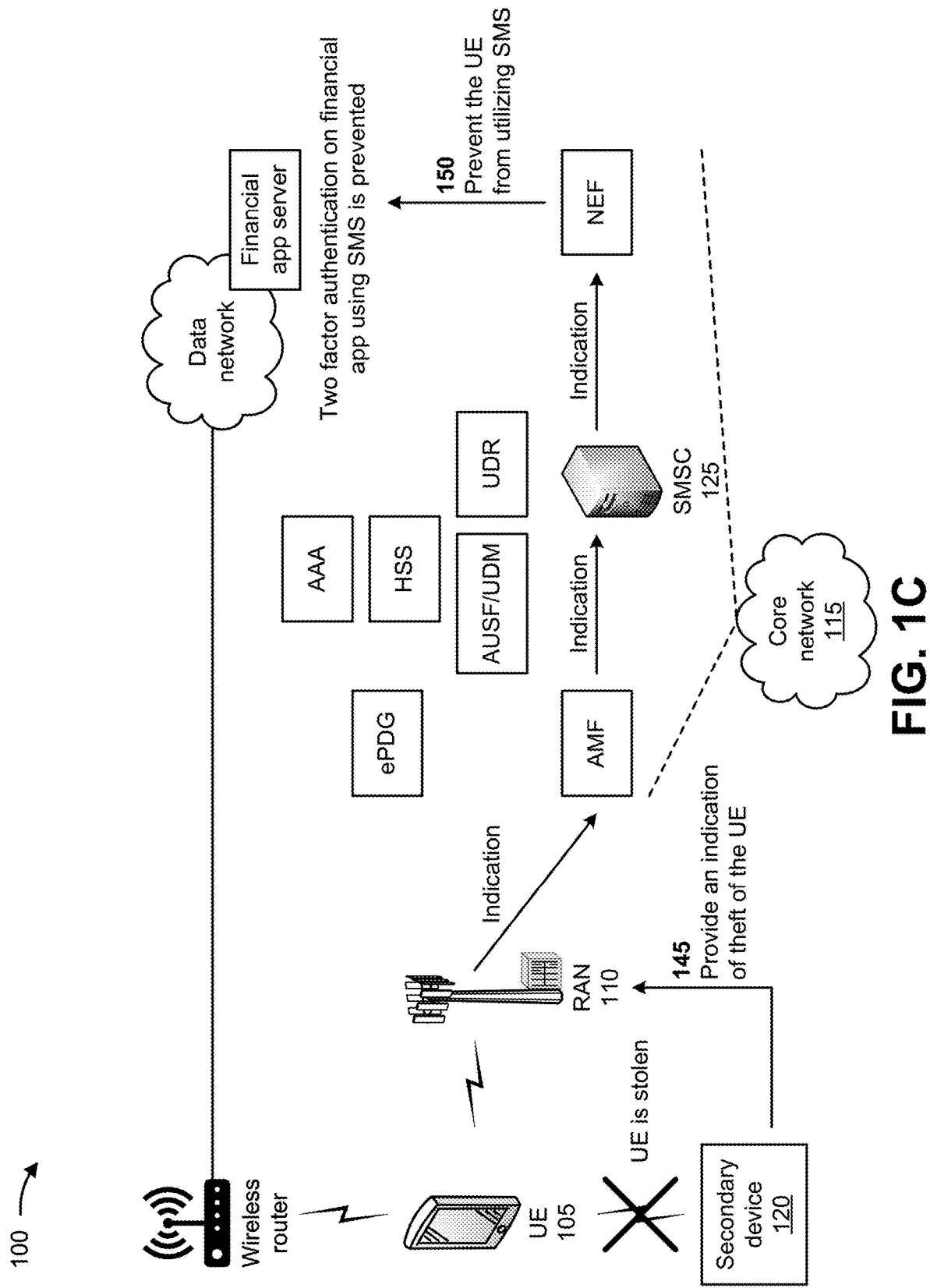

As shown in FIG. 1C, the core network 115 may include an authentication server function (AUSF), an access and mobility management function (AMF), a unified data management (UDM) component, a unified data repository (UDR), a network exposure function (NEF), the ePDG, the AAA, and the HSS. As further shown in FIG. 1C, the UE 105 may be stolen (or lost) and may lose connectivity with the secondary device 120. For example, a user of the UE 105 may have the UE 105 stolen or may lose the UE 105.

As further shown in FIG. 1C, and by reference number 145, the secondary device 120 may provide an indication of theft of the UE 105 to the RAN 110. For example, when the user of the UE 105 realizes that the UE 105 is stolen (or lost), the user may utilize the secondary device 120 to generate the indication of theft of the UE 105. In some implementations, the user may select a button of the secondary device 120 and selection of the button of the secondary device 120 may cause the secondary device 120 to generate the indication of theft of the UE 105. Alternatively, or additionally, when a location of the UE 105 is a predetermined distance from a location of the secondary device 120, the secondary device 120 may generate the indication of theft of the UE 105. Further details associated with determining whether the location of the UE 105 is the predetermined distance from the location of the secondary device 120 are provided below in connection with FIGS. 3A-3E. In some implementations, the secondary device 120 may provide the indication of theft of the UE 105 to the RAN 110, and the RAN 110 may receive the indication from the secondary device 120.

As further shown in FIG. 1C, and by reference number 150, the SMSC 125 may prevent the UE 105 from utilizing SMS for accessing the financial application server. For example, the RAN 110 may provide the indication of theft of the UE 105 to the core network 115 (e.g., to the AMF of the core network 115). The AMF may provide the indication of theft of the UE 105 to the SMSC 125. The SMSC 125 may provide the indication of the theft of the UE 105 to the NEF. In some implementations, the SMSC 125 may receive the indication of theft of the UE 105 from the AMF, and may interact with the NEF (e.g., provide the indication to the NEF) to prevent the UE 105 from utilizing SMS for accessing the financial application server based on the indication of theft of the UE 105. The NEF may interact with the financial application server before the SMS is disabled for the UE 105. In some implementations, the financial application server may require two factor authentication (e.g., via SMS) to access and utilize the financial application provided by the financial application server. The SMSC 125 may provide SMS to the UE 105 and may prevent the UE 105 from utilizing SMS for two factor authentication. Thus, the UE 105 may be unable to access and utilize the financial application.

Figure 1D:
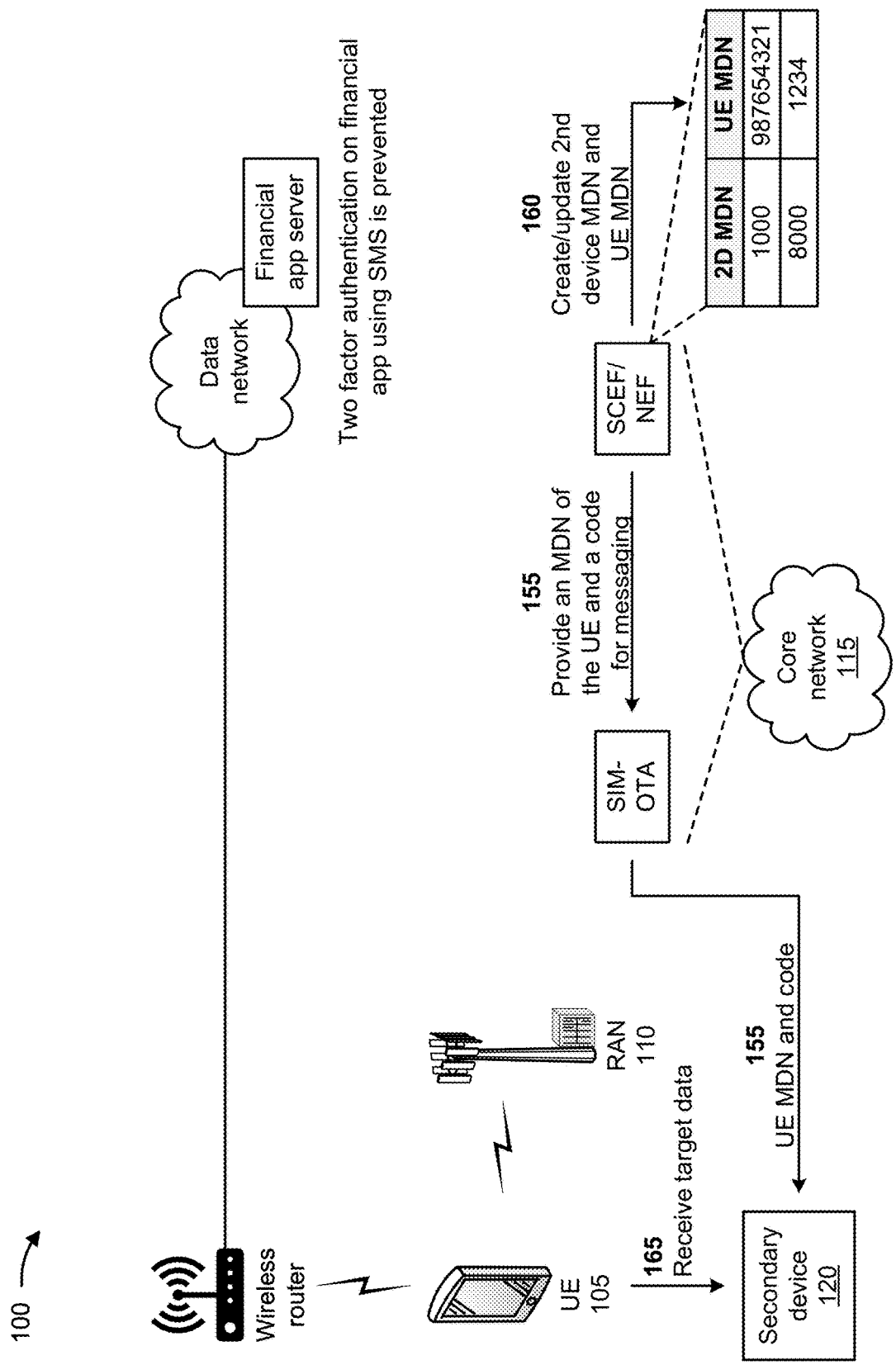

As shown in FIG. 1D, the core network 115 may include a subscriber identity module-over-the-air (SIM-OTA) and the SCEF (e.g., in a fourth generation (4G) core network 115) or the NEF (e.g., in a fifth generation (5G) core network 115). The user of the UE 105 may also possess the secondary device 120 (e.g., an IoT device, key fob, or Cat-M1 device) with a one or multi-button operation to allow the user to disable an SMS service of the UE 105 in real time when the UE 105 is stolen or lost, suspend the UE 105 in real time when the UE 105 is stolen or lost, and/or the like. The secondary device 120 may include a power saving mode and a battery that may last for years. The secondary device 120 may include a client to store information associated with financial institutions (e.g., associated with the UE 105) to which notifications are to be provided when the UE 105 is stolen or lost. The secondary device 120 may be associated with a network service (e.g., a backend application) or with the financial institution's client.

As further shown in FIG. 1D, and by reference number 155, the SCEF/NEF may provide a mobile directory number (MDN) of the UE 105 and a code for messaging to the secondary device 120, via the SIM-OTA. For example, the secondary device 120 may be over-the-air (OTA)-provisioned (e.g., via the SIM-OTA) with the MDN of the UE 105 (e.g., "987654321") and codes (e.g., "1212") associated with handling a lost or stolen UE 105 (e.g., a code to lock the UE 105, a code to disable SMS for the UE 105, a code to disable access of the UE 105 to applications, and/or the like). In some implementations, the secondary device 120 may utilize the codes when messaging the SCEF/NEF about handling the UE 105 when the UE 105 is lost or stolen. The SCEF/NEF may provide the MDN of the UE 105 and the code for messaging to the SIM-OTA, and the SIM-OTA may provide the MDN of the UE 105 and the code for messaging to the secondary device 120. The secondary device 120 may store the MDN of the 105 and the code in a data structure (e.g., a database, a table, list, and/or the like) associated with the secondary device 120.

As further shown in FIG. 1D, and by reference number 160, the SCEF/NEF may create or update an MDN of the secondary device 120 and the MDN of the UE 105 in a data structure. For example, the secondary device 120 may be associated with an MDN (e.g., "1000") and may provide the MDN of the secondary device 120 to the SCEF/NEF. The SCEF/NEF may create or update the MDN of the secondary device 120 in the data structure, and may create or update the MDN of the UE 105 in the data structure. The SCEF/NEF may associate the MDN of the secondary device 120 (e.g., "1000") and the MDN of the UE 105 (e.g., "987654321") in the data structure.

As further shown in FIG. 1D, and by reference number 165, the secondary device 120 may receive target data from the UE 105. For example, a user of the UE 105 may utilize the UE 105 to input (e.g., to the UE 105) target data identifying targets to be notified when the UE 105 is lost or stolen. The targets may include financial application providers associated with the UE 105, parents of the user of the UE 105, caregivers of the user of the UE 105, emergency services, and/or the like. The user may cause the UE 105 to provide the target data to the secondary device 120, and the secondary device 120 may receive the target data from the UE 105. In some implementations, the secondary device 120 may store the target data in a data structure associated with the secondary device 120. The secondary device 120 may provide a notification through the core network 115 and to each target (e.g., via a secure message with a user identifier or MDN). The secure message may be signed by the core network 115 through a secure channel to each target (e.g., making the message difficult to spoof).

Figure 1E:
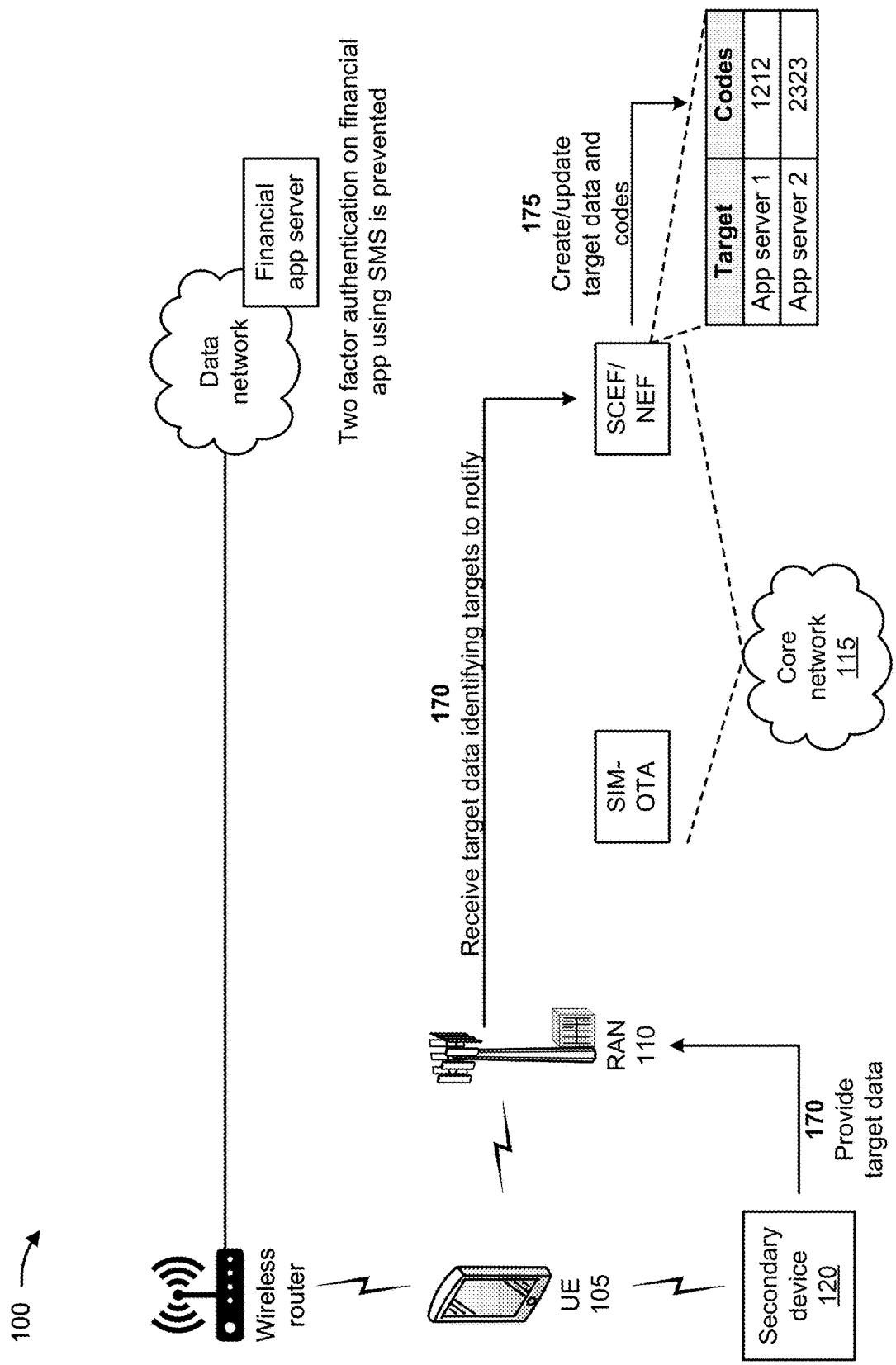

As shown in FIG. 1E, and by reference number 170, the secondary device 120 may provide, and the SCEF/NEF may receive, the target data identifying targets to notify when the UE 105 is stolen or lost. For example, the secondary device 120 may provide the target data to the RAN 110, and the RAN 110 may provide the target data to the SCEF/NEF. The SCEF/NEF may receive the target data from the RAN 110. In some implementations, the SCEF/NEF may store the target data in a data structure associated with the SCEF/NEF.

As further shown in FIG. 1E, and by reference number 175, the SCEF/NEF may create or update the target data and the codes for messaging in a data structure. For example, the SCEF/NEF may create or update the target data in the data structure, and may create or update the codes for messaging in the data structure. The SCEF/NEF may associate the target data (e.g., "App server 1") and the codes for messaging (e.g., "1212") in the data structure. In one example, a code (e.g., "1212") may indicate that the UE 105 is to be prevented from accessing a target (e.g., a first application server "App server 1") when the UE 105 is lost or stolen, another code (e.g., "2323") may indicate that SMS is to be blocked for the UE 105 with a target (e.g., a second application server "App server 2") when the UE 105 is lost or stolen, and/or the like.

Figure 1F:
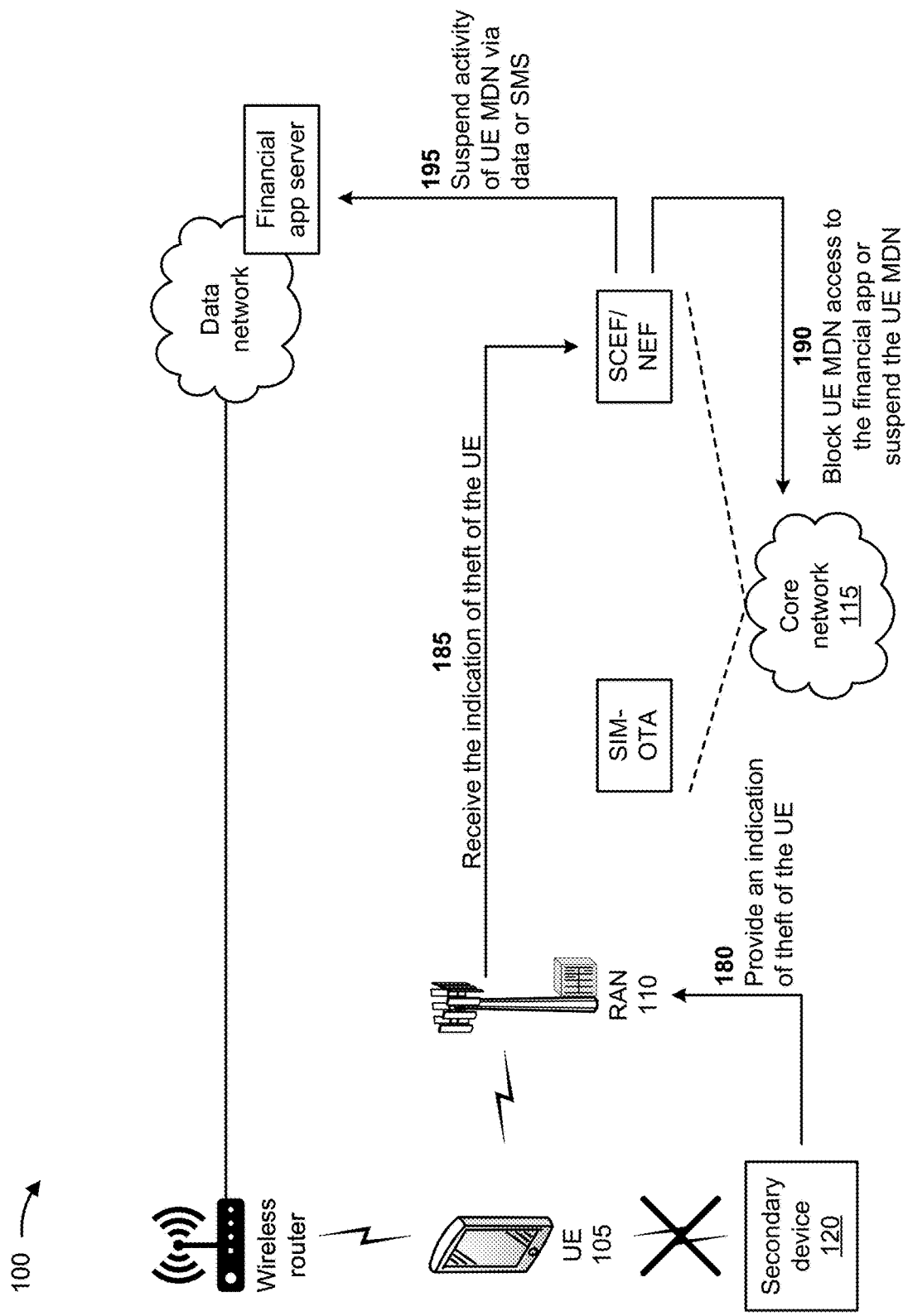

As shown in FIG. 1F, the UE 105 may be stolen (or lost) and may lose connectivity with the secondary device 120. For example, a user of the UE 105 may have the UE 105 stolen or may lose the UE 105. As further shown in FIG. 1F, and by reference number 180, the secondary device 120 may provide an indication of theft of the UE 105 to the RAN 110. For example, when the user of the UE 105 realizes that the UE 105 is stolen (or lost), the user may utilize the secondary device 120 to generate the indication of theft of the UE 105. In some implementations, the user may select a button of the secondary device 120 and selection of the button of the secondary device 120 may cause the secondary device 120 to generate the indication of theft of the UE 105. Alternatively, or additionally, when a location of the UE 105 is a predetermined distance from a location of the secondary device 120, the secondary device 120 may generate the indication of theft of the UE 105. Further details associated with determining whether the location of the UE 105 is the predetermined distance from the location of the secondary device 120 are provided below in connection with FIGS. 3A-3E. In some implementations, the secondary device 120 may provide the indication of theft of the UE 105 to the RAN 110, and the RAN 110 may receive the indication from the secondary device 120.

In some implementations, the UE 105 and the secondary device 120 may be connected to the RAN 110 and the core network 115. The RAN 110 and/or the core network 115 may utilize use the connections with the UE 105 and the secondary device 120 to determine locations of the UE 105 and the secondary device 120. The RAN 110 and/or the core network 115 may determine a distance between the UE 105 and the secondary device 120 (e.g., that have been previously paired or associated with each other) based on the locations of the UE 105 and the secondary device 120. If the determined distance exceeds a threshold distance, then the RAN 110 and/or the core network 115 may act and/or notify the UE 105 and/or the secondary device 120.

As further shown in FIG. 1F, and by reference number 185, the SCEF/NEF may receive an indication of theft of the UE 105 from the RAN 110. For example, the RAN 110 may provide the indication of theft of the UE 105 to the core network 115 (e.g., to the SCEF/NEF of the core network 115). The SCEF/NEF may receive the indication of the theft of the UE 105 from the RAN 110.

As further shown in FIG. 1F, and by reference number 190, the SCEF/NEF may block the MDN of the UE 105 from access to the financial application server or may suspend the MDN of the UE 105. For example, the SCEF/NEF may cause the core network 115 to prevent or block the MDN of the UE 105 from access to the financial application server based on the indication of theft of the UE 105. In some implementations, the SCEF/NEF may cause the core network 115 to suspend the MDN of the UE 105 from access to the core network 115 based on the indication of theft of the UE 105.

As further shown in FIG. 1F, and by reference number 195, the SCEF/NEF may suspend activity of the MDN of the UE 105 via data or SMS. For example, the SCEF/NEF suspend activity of the MDN of the UE 105 via the data network or an SMS based on the indication of theft of the UE 105. In some implementations, the financial application server may require two factor authentication (e.g., via SMS) to access and utilize the financial application provided by the financial application server. The SCEF/NEF may enable SMS for the UE 105 and may prevent the UE 105 from utilizing SMS for two factor authentication. Thus, the UE 105 may be unable to access and utilize the financial application via SMS and/or the data network.

In some implementations, the SCEF/NEF may handle messages from the secondary device 120 and may perform various actions per policy and priorities based on the messages. The SCEF/NEF may block messages to the MDN of the UE 105 when the UE 105 is stolen or lost, may suspend the MDN of the UE 105 when the UE 105 is stolen or lost, may notify targets when the UE 105 is lost or stolen, and/or the like. In some implementations, the secondary device 120 may be utilized as an emergency device for children, elderly people, people in danger, and/or the like and to contact emergency services when the UE 105 is unavailable.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
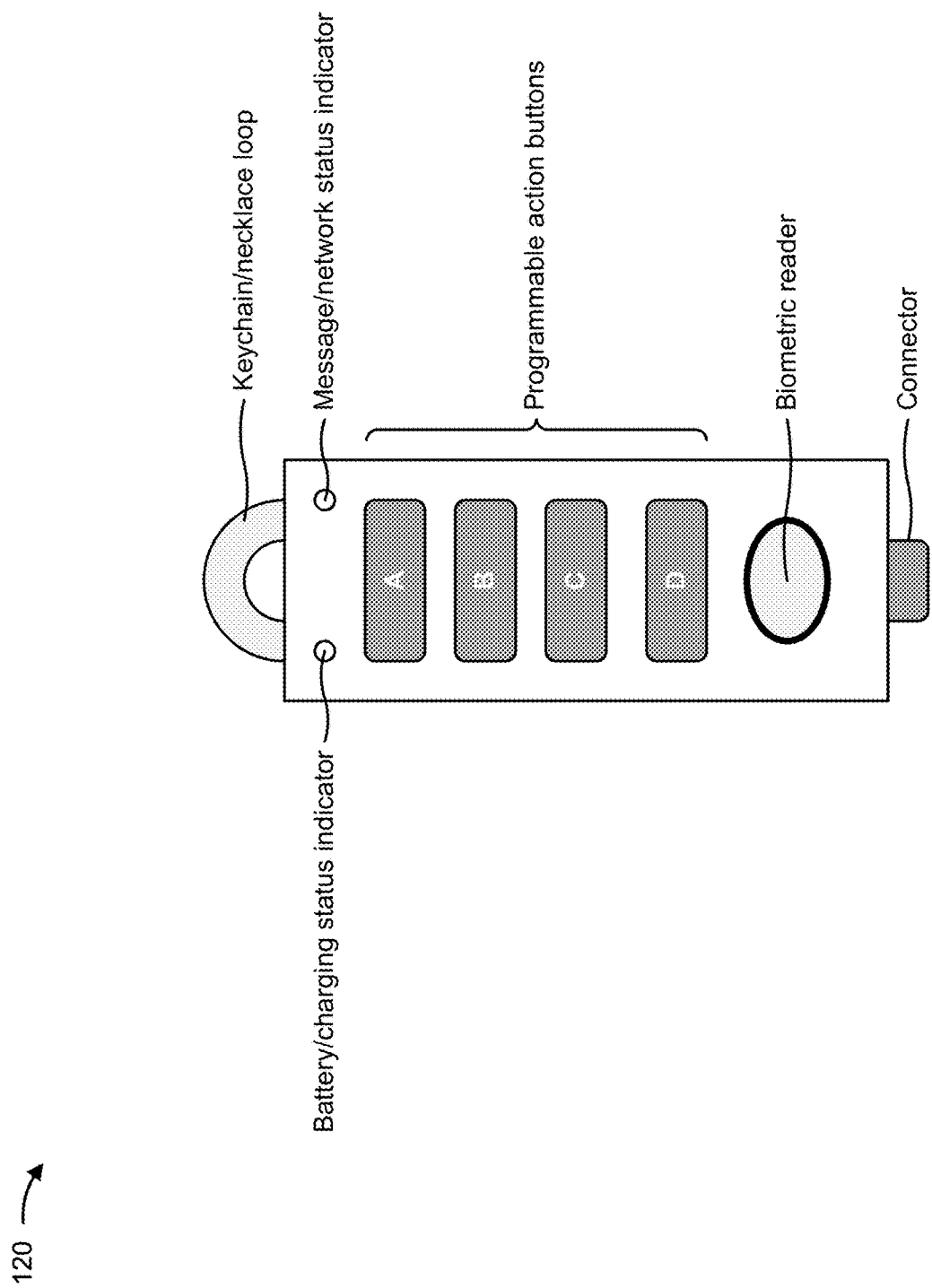
FIG. 2 is a diagram of example components of a secondary device depicted in FIGS. 1A-1F.

FIG. 2 is a diagram of example components of the secondary device 120 depicted in FIGS. 1A-1F. As shown in FIG. 2, the secondary device 120 may include a keychain/necklace loop, a battery/charging status indicator, a message/network status indicator, programmable action buttons, a biometric reader, and a connector. The keychain/necklace loop may connect to a housing of the secondary device 120 and may enable the secondary device 120 to be attached to a keychain, a necklace, a bookbag, a pocketbook, and/or the like.

The battery/charging status indicator may include an optical element (e.g., a light-emitting diode (LED) indicator) that is colored based on a charging status of a battery of the secondary device 120. For example, the battery/charging status indicator may be green when the battery is charged, may be yellow when the battery is partially charged, may be red when the battery needs to be charged, and/or the like. The battery/charging status indicator may be provided since the secondary device 120 may be seldomly invoked and should be properly charged.

The message/network status indicator may include an optical element (e.g., an LED indicator) that is colored based on a status of a message sent by the secondary device 120 or a status of a network connection of the secondary device 120. For example, the message/network status indicator may be green when the secondary device 120 the message is delivered or the network connection is good, may be yellow when the message is in transit or the network connection is fair, may be red when the message is not delivered or the network connection is poor, and/or the like. The message/network status indicator may enhance usage of the secondary device 120.

The programmable action buttons may include buttons that, when selected, cause the secondary device 120 to perform one or more actions. For example, one of the programmable action buttons may cause the secondary device 120 to generate an indication of loss or theft of the UE 105, one of the programmable action buttons may cause the secondary device 120 to generate an emergency alert to emergency services, and/or the like.

The biometric reader may include hardware used to capture a biometric (e.g., a fingerprint) of a user for verification of identity. The secondary device 120 may match a captured biometric against biometrics stored in the secondary device 120 (e.g., in a subscriber identity module (SIM) of the secondary device 120) in order to approve or deny access to the secondary device 120. The biometric reader may verify that a person actuating the biometric reader is an authorized user of the secondary device 120 and not an inadvertent actuation or unauthorized deactivation request. Alternatively, the secondary device 120 may include a local key, unique to the second device 120, to access network-based biometrics to compare against captured by the biometric reader. This would allow the same credentials to be used across the UE 105, the secondary device 120, and other devices.

The connector may include a mechanism (e.g., universal serial bus (USB) connector) that enables the secondary device 120 to connect with another device (e.g., a computer) for secure communication with the other device, to connect to a power supply for charging the battery of the secondary device 120, and/or the like.

In some implementations, the secondary device 120 may include narrowband IoT connectivity, Cat-M1 connectivity, Bluetooth connectivity, and/or the like to enable the secondary device 120 to communicate with other devices (e.g., the UE 105, the RAN 110, the core network 115, and/or the like). In some implementations, the programmable action buttons may be mapped to multiple UEs 105 or other devices. In some implementations, the secondary device 120 may utilized for security purposes (e.g., select a programmable action button to generate the indication of the lost or stolen UE 105, select another programmable action button to indicate a false alarm, and/or the like).

In some implementations, if the secondary device 120 determines that the secondary device 120 is separated from the UE 105 (e.g., by at least a predetermined distance), the secondary device 120 may provide the indication of the lost or stolen UE 105 to the core network 115 and/or the wireless network. If the secondary device 120 is not connected to any network, the secondary device 120 may store the indication, may attempt to connect to a network or receive a notification of network status, and may send the indication once connected to the network.

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2.

FIGS. 3A-3E are diagrams of an example 300 associated with protecting account information associated with a stolen UE based on a UE application and/or a backend application. As shown in FIGS. 3A-3E, example 300 includes the UE 105 (e.g., associated with a UE application), the RAN 110, the core network 115 (e.g., associated with a backend application), the secondary device 120, the wireless router, and the data network. Further details of the UE 105, the UE application, the RAN 110, the core network 115, the backend application, the secondary device 120, the wireless router, and the data network are provided elsewhere herein.

In some implementations, example 300 may provide a network-based solution via the backend application (e.g., without the UE application). The network-based solution may include the backend application periodically receiving geolocations of the UE 105 and the secondary device 120 via network application programming interfaces (APIs). The backend application may receive safe location zones using network APIs, may periodically receive unsafe location zones using network APIs, and may utilize the safe location zones and the unsafe location zones to determine frequency of monitoring and to generate heightened security alerts. The backend application may periodically perform proximity checks to determine a separation between the UE 105 and the secondary device 120. When separation is detected, the backed application may generate a separation alert and may perform one or more actions using network APIs.

In some implementations, example 300 may provide a Bluetooth-based solution via the UE application (e.g., without the backend application). The Bluetooth-based solution may include the UE application periodically receiving a geolocation of the UE 105 (e.g., from an operating system of the UE 105) and calculating a geolocation of the secondary device 120 via Bluetooth connectivity. The UE application may receive safe location zones using network APIs, may periodically receive unsafe location zones using network APIs, and may utilize the safe location zones and the unsafe location zones to determine frequency of monitoring and to generate heightened security alerts. The UE application may periodically perform proximity checks to determine a separation between the UE 105 and the secondary device 120. When separation is detected, the UE application may generate a separation alert and may perform one or more actions using network APIs. If a frequency of proximity checks is reduced, battery usage may be reduced for the secondary device 120 (e.g., monitor battery health and/or status and lower the frequency of proximity checks when a low battery is detected).

In some implementations, example 300 may provide a hybrid-based solution via the UE application and the backend application. The hybrid-based solution may include the UE application periodically receiving a geolocation of the UE 105 (e.g., from an operating system of the UE 105) and calculating a geolocation of the secondary device 120 via Bluetooth connectivity. The UE application may receive safe location zones using network APIs, may periodically receive unsafe location zones using network APIs, and may utilize the safe location zones and the unsafe location zones to determine frequency of monitoring and to generate heightened security alerts. The UE application may periodically perform proximity checks to determine a separation between the UE 105 and the secondary device 120. When separation is detected, the UE application may inform the backend application, and the backend application may periodically receive geolocations of the UE 105 and the secondary device 120 via network APIs. The backend application may perform proximity checks to determine a separation between the UE 105 and the secondary device 120. When separation is detected, the backed application may generate a separation alert and may perform one or more actions using network APIs.

Figure 3A:
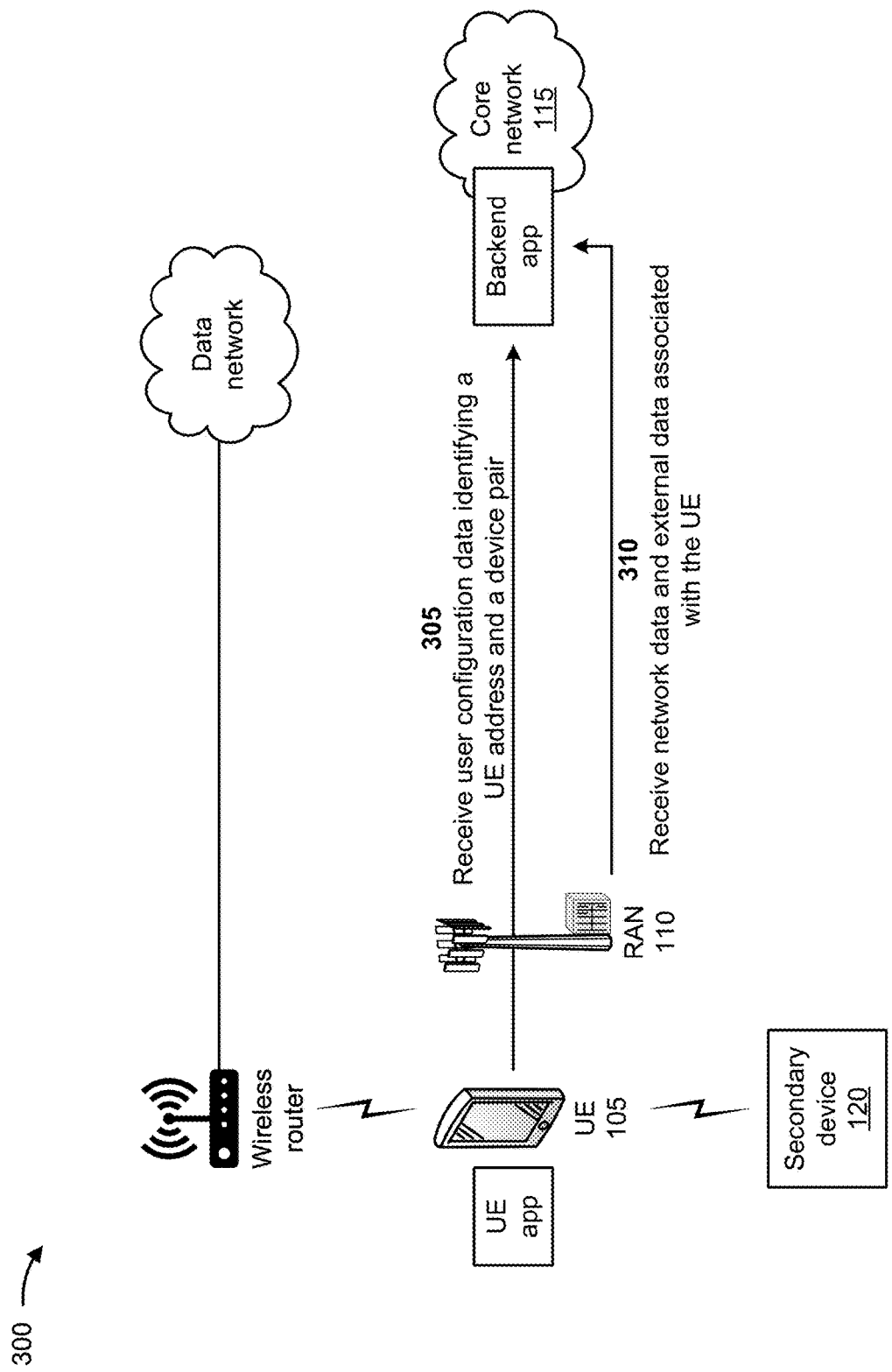
FIGS. 3A-3E are diagrams of an example associated with protecting account information associated with a stolen UE.

As shown in FIG. 3A, and by reference number 305, the core network 115 may receive user configuration data identifying an address of the UE 105 and a device pair (e.g., the UE 105 and the secondary device 120). For example, the UE 105 may generate the user configuration data, and may provide the user configuration data to the core network 115. The core network 115 may receive the user configuration data from the UE 105. The user configuration data may include one or more addresses associated with the UE 105 (e.g., a home address of the user of the UE 105, a work address of the user, and/or the like) and an identifier of paired devices (e.g., the UE 105 and the secondary device 120).

As further shown in FIG. 3A, and by reference number 310, the core network 115 may receive network data and external data associated with the UE 105. For example, the core network 115 and/or the UE 105 may receive the network data and the external data associated with the UE 105. The network data may include data identifying congestion associated with the UE 105 and/or the RAN 110. The congestion may be determined based on the RAN 110 including several connected UEs 105, the RAN 110 including more UEs 105 devices per interval, the RAN 110 being associated with high network connectivity churn, the RAN 110 being associated with mobile UEs 105 (e.g., based on movement of an average UE 105). High network connectivity churn may indicate a quantity of transient mobile UEs 105 passing through the RAN 110.

The UE application and/or the backend application may monitor interactions between the UE 105 and the RAN 110 to determine the congestion. The UE application and/or the backend application may utilize the network data to extrapolate into geolocation zones which may be exposed via APIs. The UE application and/or the backend application may utilize the APIs to retrieve the zone information and apply the zone information as part of periodic proximity checks. In some implementations, the UE application and/or the backend application may track information for the UE 105 across connected zones. This information may be utilized to compare between last and current zones to determine if additional notifications and actions are necessary.

The UE application and/or the backend application may utilize the external data to determine unsafe geolocation zones. The external data may include data identifying high traffic locales (e.g., airports, train stations, bus stations, large restaurants, bars, clubs, and/or the like), downtown areas with high pedestrian count, crime rate data (e.g., robberies, burglaries, aggregate violent crimes, and/or the like), designated non-residential areas, parks, schools, and/or the like. The UE application and/or the backend application may utilize the external data to identify geolocation zones which are exposed via APIs. The UE application and/or the backend application may utilize the zone information to perform periodic proximity checks. The UE application and/or the backend application may track information for the UE 105 across the connected zones, and may compare last and current zones to determine if additional notifications and actions are necessary.

Figure 3B:
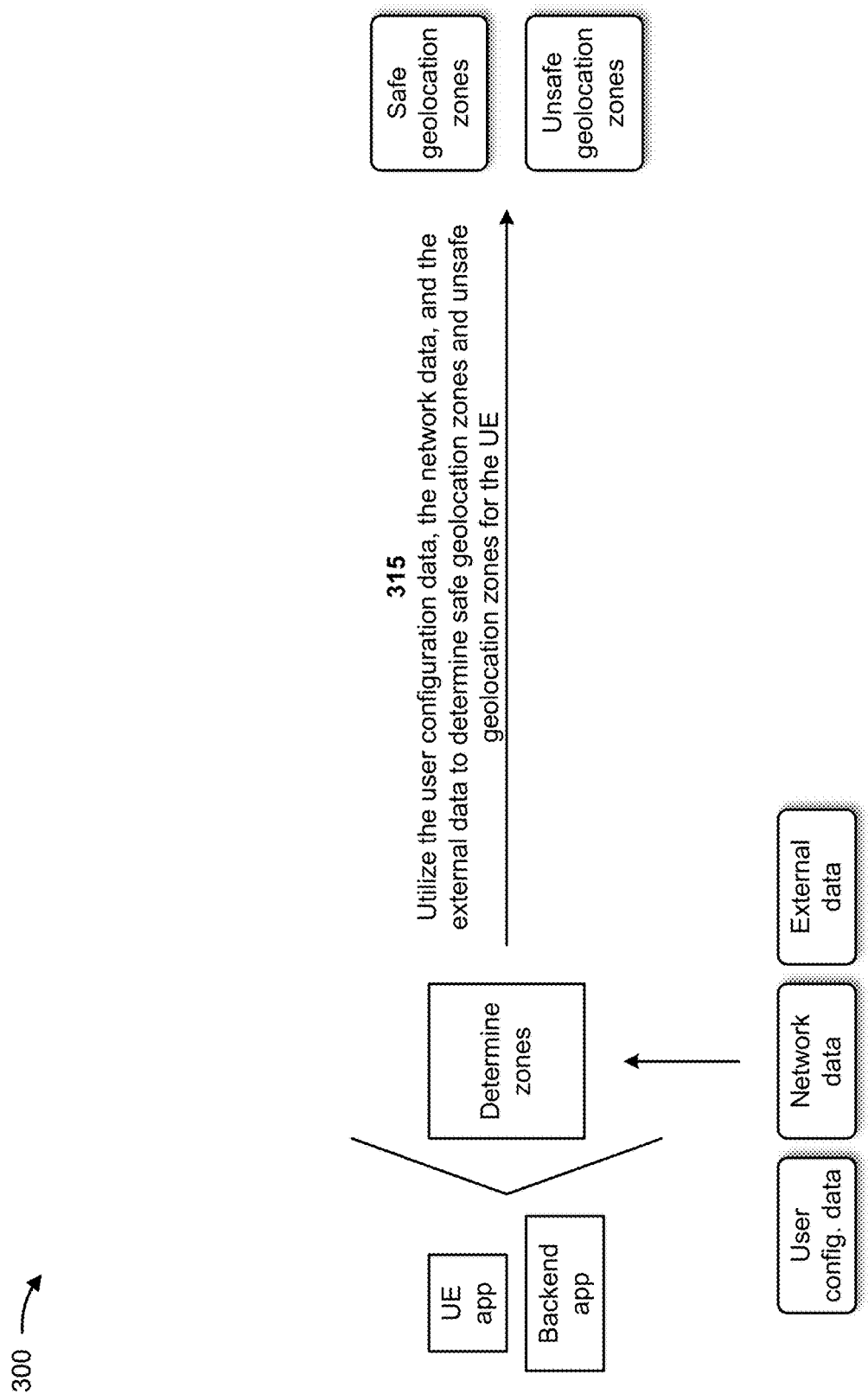

As shown in FIG. 3B, and by reference number 315, the UE 105 (e.g., the UE application) and/or the core network 115 (e.g., the backend application) may utilize the user configuration data, the network data, and the external data to determine safe geolocation zones and unsafe geolocation zones for the UE 105. For example, the UE application and/or the backend application may utilize the user configuration data, the network data, and the external data to determine the safe geolocation zones. In some implementations, the UE application and/or the backend application may determine addresses provided by the UE 105 as safe geolocation zones. For example, the UE application and/or the backend application may determine a home address, a school address, an office address, a relative's address, and/or the like to be safe geolocation zones. In some implementations, the UE application and/or the backend application may utilize the user configuration data, the network data, and the external data to determine the unsafe geolocation zones. For example, the UE application and/or the backend application may utilize the UE 105 and network congestion on the RAN 110 to identify potential unsafe geolocation zones.

Figure 3C:
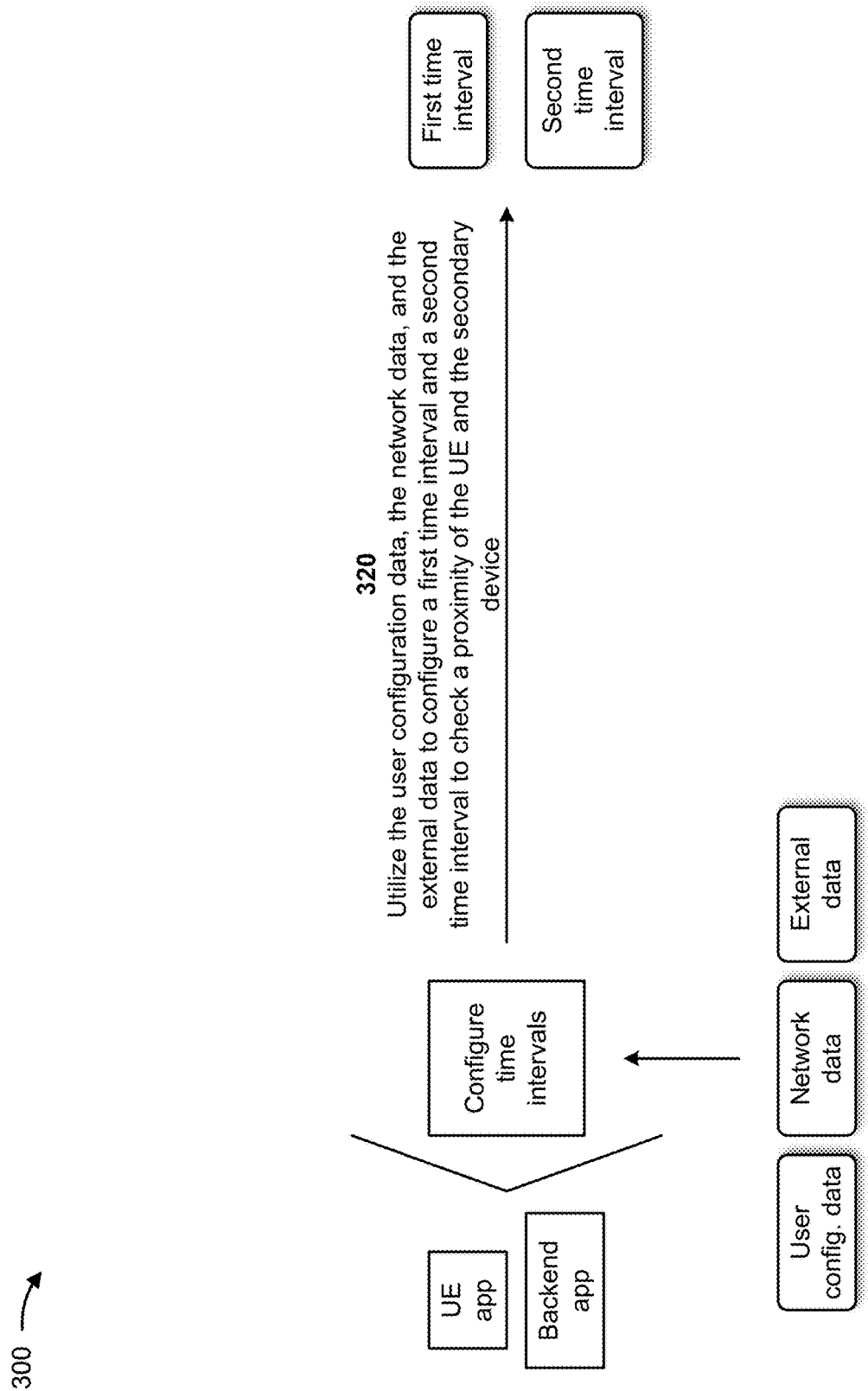

As shown in FIG. 3C, and by reference number 320, the UE 105 (e.g., the UE application) and/or the core network 115 (e.g., the backend application) may utilize the user configuration data, the network data, and the external data to configure a first time interval and a second time interval to check a proximity of the UE 105 and the secondary device 120. For example, the UE application and/or the backend application may determine that the UE 105 is located in one of the safe geolocation zones, and may specify the first time interval (e.g., in seconds, minutes, and/or the like) to check the proximity of the UE 105 and the secondary device 120 based on determining that the UE 105 is located in one of the safe geolocation zones. Alternatively, the UE application and/or the backend application may determine that the UE 105 is located in one of the unsafe geolocation zones, and may specify the second time interval (e.g., in seconds, minutes, and/or the like) to check the proximity of the UE 105 and the secondary device 120 based on determining that the UE 105 is located in one of the unsafe geolocation zones. In some implementations, the second time interval may be shorter than the first time interval since the UE 105 is located in an unsafe geolocation zone.

Figure 3D:
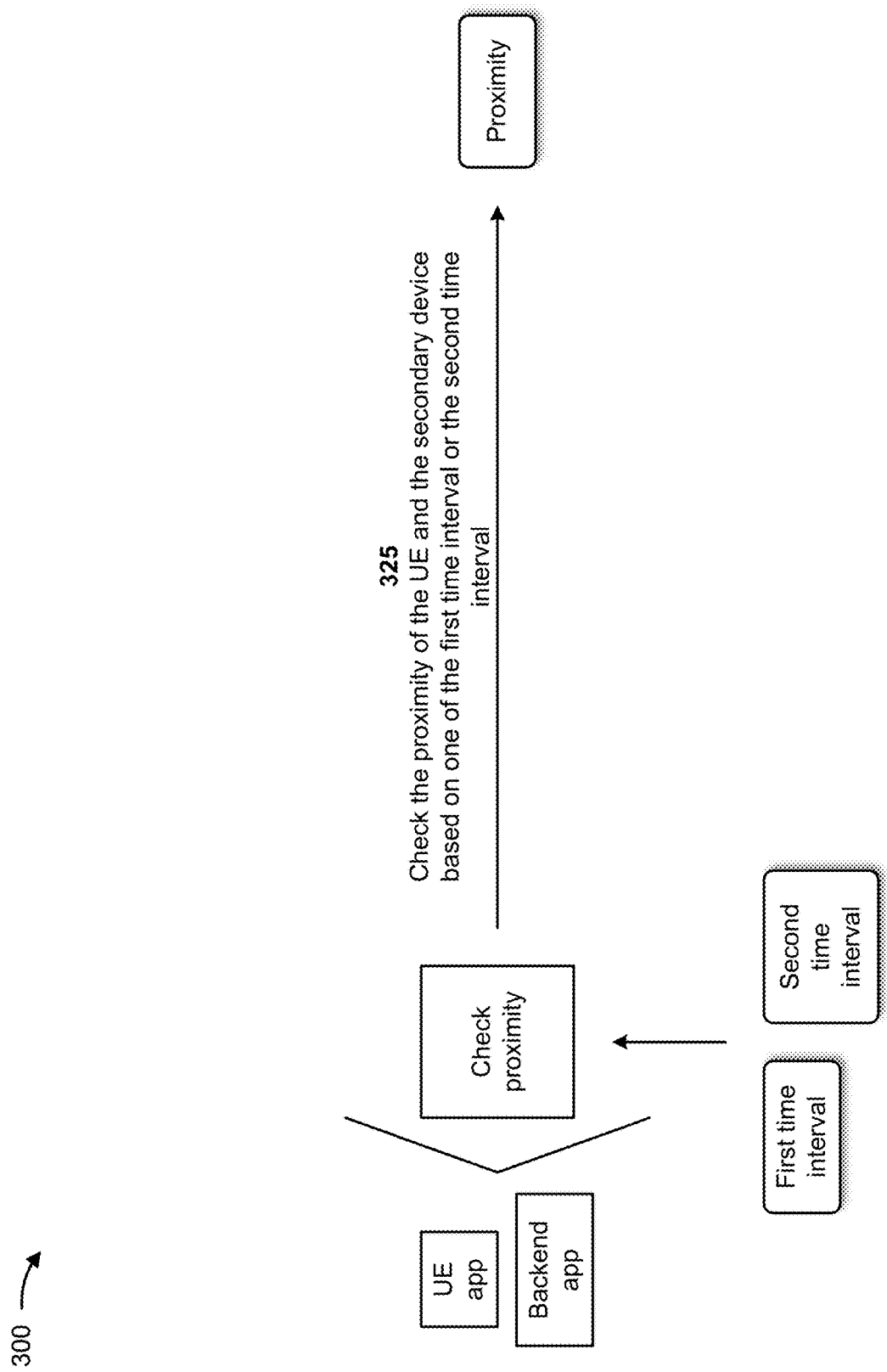

As shown in FIG. 3D, and by reference number 325, the UE 105 (e.g., the UE application) and/or the core network 115 (e.g., the backend application) may check the proximity of the UE 105 and the secondary device 120 based on one of the first time interval or the second time interval. For example, the UE application and/or the backend application may specify a proximity threshold of the UE 105 and the secondary device 120 (e.g., in meters) that should not be exceeded. For the first time interval or the second time interval, the UE application and/or the backend application may determine a current geolocations for the UE 105 and the secondary device 120. For example, the UE application and/or the backend application may receive the geolocation of the UE 105 from a network API, and may receive the geolocation of the secondary device 120 from a network API. The UE application and/or the backend application may determine whether the geolocations of the UE 105 and the secondary device 120 are within a safe geolocation zone or an unsafe geolocation zone. The UE application and/or the backend application may calculate a proximity between the UE 105 and the secondary device 120 utilizing the first time interval or the second time interval based on whether the geolocations of the UE 105 and the secondary device 120 are within a safe geolocation zone or an unsafe geolocation zone.

Figure 3E:
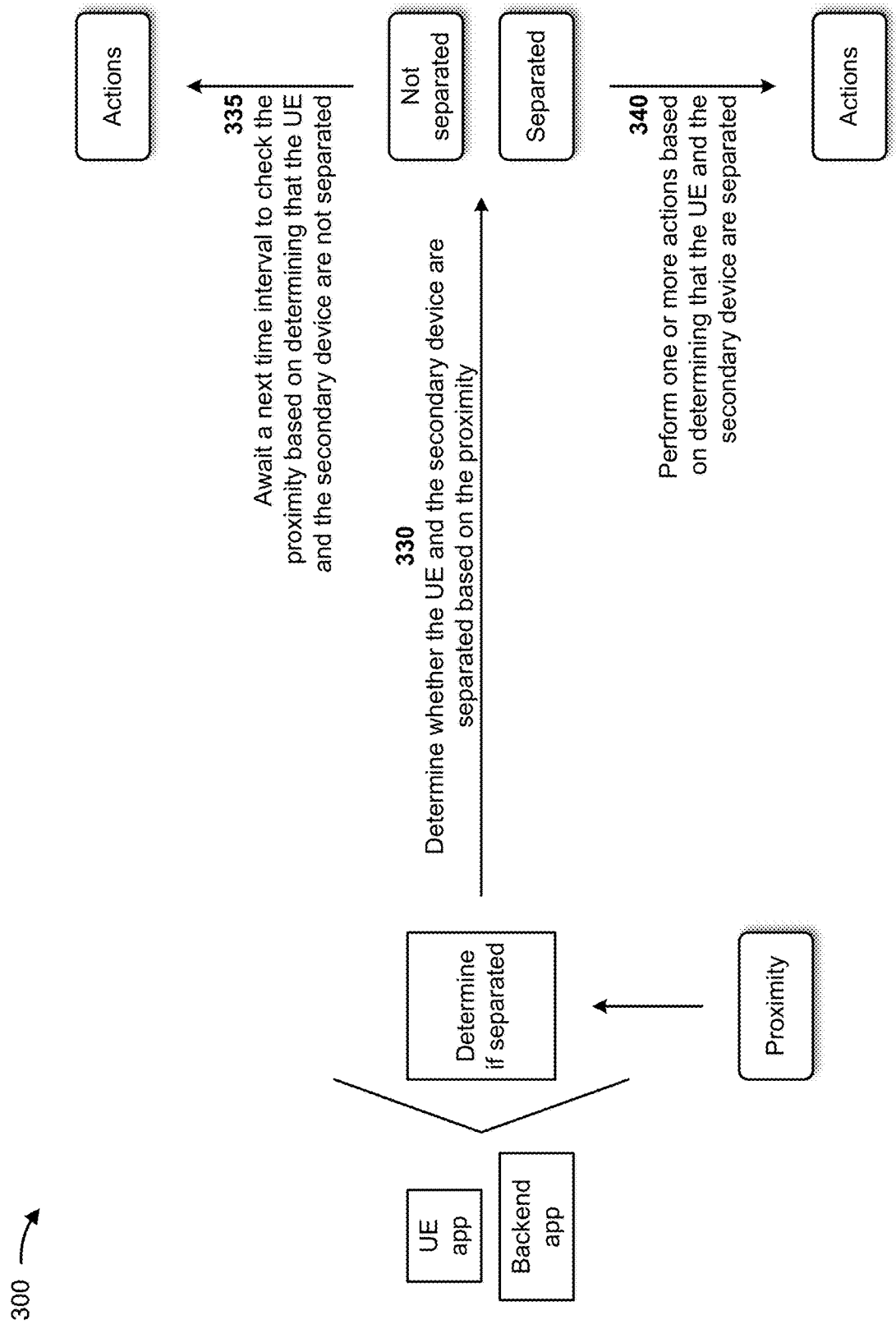

As shown in FIG. 3E, and by reference number 330, the UE 105 (e.g., the UE application) and/or the core network 115 (e.g., the backend application) may determine whether the UE 105 and the secondary device 120 are separated based on the proximity. For example, the UE application and/or the backend application may determine whether the UE 105 and the secondary device 120 are separated based on comparing the proximity and the proximity threshold. In some implementations, the UE application and/or the backend application may determine that the UE 105 and the secondary device 120 are separated when the proximity exceeds the proximity threshold. Alternatively, the UE application and/or the backend application may determine that the UE 105 and the secondary device 120 are not separated when the proximity fails to exceed the proximity threshold.

As further shown in FIG. 3E, and by reference number 335, the UE 105 (e.g., the UE application) and/or the core network 115 (e.g., the backend application) may await a next time interval to check the proximity based on determining that the UE 105 and the secondary device 120 are not separated. For example, when the UE application and/or the backend application determine that the UE 105 and the secondary device 120 are not separated, the UE application and/or the backend application may await a next time interval to check the proximity of the UE 105 and the secondary device 120. If the UE 105 and the secondary device 120 are not separated and are within a safe geolocation zone, the UE application and/or the backend application may set an interval setting to the first time interval if the interval setting was previously set to the second time interval. If the UE 105 and the secondary device 120 are not separated and are within an unsafe geolocation zone, the UE application and/or the backend application may set an interval setting to the second time interval if the interval setting was previously set to the first time interval. In such situations, the UE application and/or the backend application may generate a heightened security posture alert (HSPA) notification that may be provided to various applications for additional authentication factors. If the UE 105 and the secondary device 120 are not separated and are not within safe or unsafe geolocation zones, the UE application and/or the backend application may set an interval setting to the first time interval if the interval setting was previously set to the second time interval.

As further shown in FIG. 3E, and by reference number 340, the UE 105 (e.g., the UE application) and/or the core network 115 (e.g., the backend application) may perform one or more actions based on determining that the UE 105 and the secondary device 120 are separated. For example, when the UE application and/or the backend application determine that the UE 105 and the secondary device 120 are separated, the UE application and/or the backend application may perform one or more actions, as described below. If the UE 105 and the secondary device 120 are separated and are within a safe geolocation zone, the UE application and/or the backend application may set an interval setting to the first time interval if the interval setting was previously set to the second time interval. If the UE 105 and the secondary device 120 are separated and are within an unsafe geolocation zone, the UE application and/or the backend application may set an interval setting to the second time interval if the interval setting was previously set to the first time interval.

If the UE 105 and the secondary device 120 are separated and are not within a safe geolocation zone, the UE application and/or the backend application may generate an HSPA notification that may be provided to various applications for additional authentication factors. If the UE 105 and the secondary device 120 are separated and are not within a safe geolocation zone, the UE application and/or the backend application may perform one or more actions, such as block, redirect, or secure-proxy SMS for the UE 105, quarantine the UE 105, and/or the like. When quarantining the UE 105, the UE application and/or the backend application may route network traffic to and from the UE 105 to honey pot services. The honey pot services may utilize machine learning techniques and real-time assisted remote desktop operations to emulate various application profiles that capture interactions in real time so that malicious intents of bad actors may be is analyzed to reveal new cyber-crime techniques. The honey pot services may be implemented in a manner that protects data privacy of the user of the UE 105. Data captured by the honey pot services may be exposed to authorized entities via APIs (e.g., law enforcement agencies, security forensic teams, cybersecurity analysts, and/or the like). The honey pot services may emulate various application profiles that capture interactions in real time so that malicious intents of bad actors may be analyzed and reveal new cybercrime techniques.

In this way, the device protects account information associated with a stolen UE 105. For example, the device may enable remote locking or disabling of a lost or stolen UE 105 based on an input received from the secondary device 120 associated with the UE 105. The device may block SMS features of the lost or stolen UE 105 to prevent two factor authentication by the UE 105 for accessing applications on the UE 105. Thus, the device may conserve computing resources, networking resources, and/or other resources that would have otherwise been consumed by failing to protect account information associated with a stolen or lost UE 105, handling the repercussions associated with theft of the account information, providing a poor user experience for a user of the stolen or lost UE 105, involving law enforcement and/or financial institutions in attempting to identify a bad actor associated with the stolen or lost UE 105, and/or the like.

As indicated above, FIGS. 3A-3E are provided as an example. Other examples may differ from what is described with regard to FIGS. 3A-3E. The number and arrangement of devices shown in FIGS. 3A-3E are provided as an example. In practice, there may be additional devices, fewer devices, different devices, or differently arranged devices than those shown in FIGS. 3A-3E. Furthermore, two or more devices shown in FIGS. 3A-3E may be implemented within a single device, or a single device shown in FIGS. 3A-3E may be implemented as multiple, distributed devices. Additionally, or alternatively, a set of devices (e.g., one or more devices) shown in FIGS. 3A-3E may perform one or more functions described as being performed by another set of devices shown in FIGS. 3A-3E.

Figure 4:
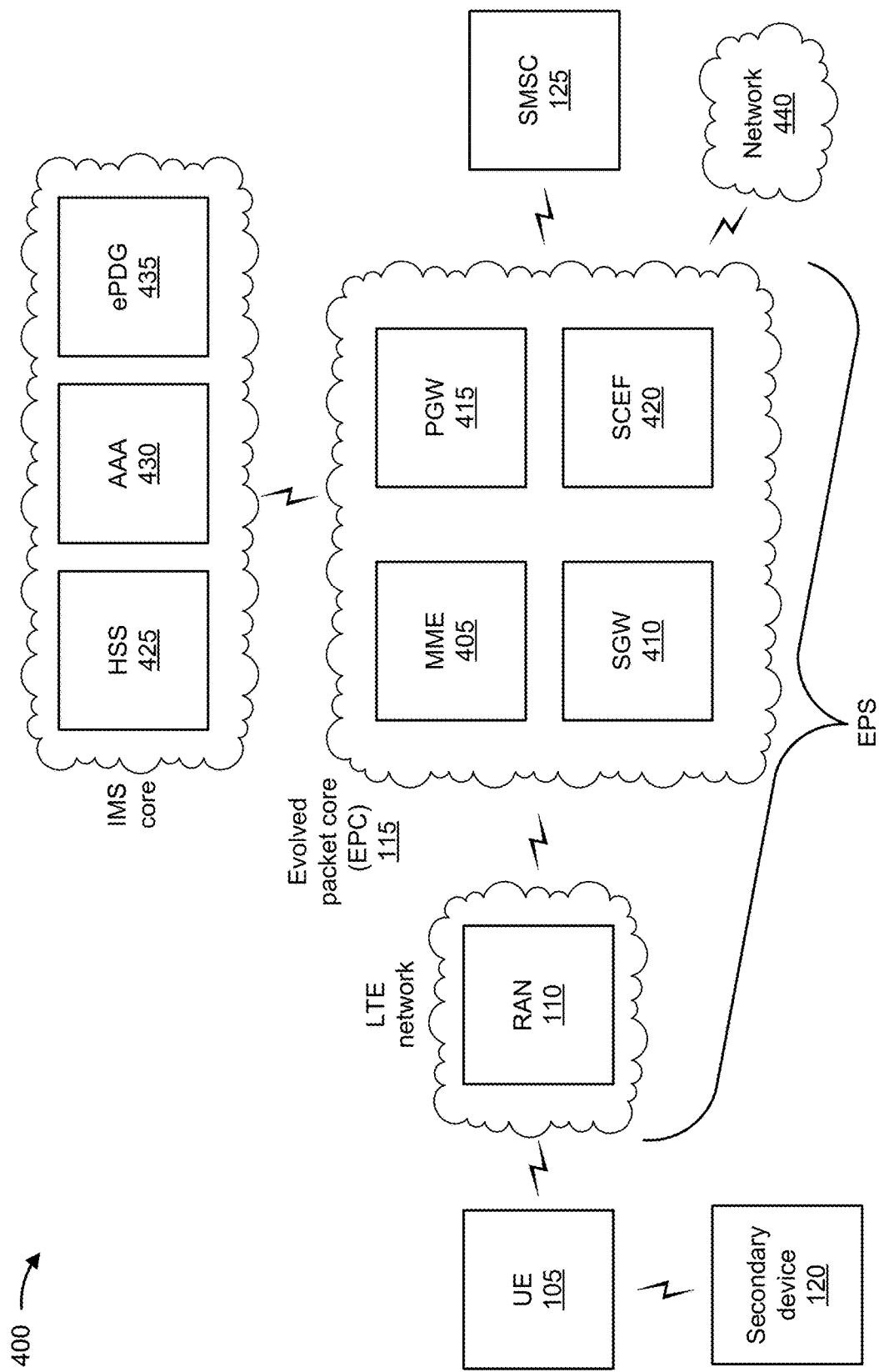
FIGS. 4 and 5 are diagrams of example environments in which systems and/or methods described herein may be implemented.

FIG. 4 is a diagram of an example environment 400 in which systems and/or methods, described herein, may be implemented. As shown in FIG. 4, the environment 400 may include the UE 105, the RAN 110, the secondary device 120, the SMSC 125, an MME 405, an SGW 410, a PGW 415, an SCEF 420, an HSS 425, an AAA 430, an ePDG 435, and a network 440. Devices of the environment 400 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, satellites, backhauls, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or side-link communications of the UE 105 covered by the RAN 110).

The secondary device 120 includes one or more devices capable of receiving, generating, storing, processing, and/or providing information, such as information described herein. For example, the secondary device 120 may include an IoT device, a key fob (e.g., a remote control with a radio frequency identification (RFID) chip and an antenna that uses radio frequencies to communicate with another RFID tag inside a reader device), a category M1 (Cat-M1) device, and/or the like capable of communicating with the UE 105, the RAN 110, and/or the core network 115.

The SMSC 125 includes one or more devices capable of receiving, generating, storing, processing, and/or providing information, such as information described herein. For example, the SMSC 125 may include a network device that handles text message operations. The SMSC 125 may be responsible for receiving, storing, routing, and forwarding SMS messages from mobile devices (e.g., the UE 105).

Some implementations are described herein as being performed within a long-term evolution (LTE) network for explanatory purposes. Some implementations may be performed within a network that is not an LTE network, such as a third generation (3G) network or a 5G network.

The environment 400 may include an evolved packet system (EPS) that includes an LTE network and/or an evolved packet core (EPC) (e.g., the core network 115) that operate based on a third-generation partnership project (3GPP) wireless communication standard. The LTE network may include the RAN 110 that includes one or more base stations that take the form of evolved Node Bs (eNBs) via which the UE 105 communicates with the EPC. The EPC may include the MME 405, the SGW 410, PGW 415, and/or the SCEF 420 to enable the UE 105 to communicate with the network 440 and/or an Internet protocol (IP) multimedia subsystem (IMS) core. The IMS core may include the HSS 425, the AAA 430, and/or the ePDG 435, and may manage device registration and authentication, session initiation, and/or other operations associated with the UE 105. The HSS 425, the AAA 430, and/or the ePDG 435 may reside in the EPC and/or the IMS core.

The MME 405 includes one or more devices, such as one or more server devices, capable of managing authentication, activation, deactivation, and/or mobility functions associated with the UE 105. In some implementations, the MME 405 may perform operations relating to authentication of the UE 105. Additionally, or alternatively, the MME 405 may facilitate the selection of a particular SGW 410 and/or a particular PGW 415 to provide traffic to and/or from the UE 105. The MME 405 may perform operations associated with handing off the UE 105 from a first RAN 110 to a second RAN 110 when the UE 105 is transitioning from a first cell associated with the first RAN 110 to a second cell associated with the second RAN 110. Additionally, or alternatively, the MME 405 may select another MME (not pictured), to which the UE 105 should be handed off (e.g., when the UE 105 moves out of range of the MME 405).

The SGW 410 includes one or more devices capable of routing packets. For example, the SGW 410 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, the SGW 410 may aggregate traffic received from one or more RANs 110 associated with the LTE network, and may send the aggregated traffic to the network 440 (e.g., via the PGW 415) and/or other network devices associated with the EPC and/or the IMS core. The SGW 410 may receive traffic from network the 440 and/or other network devices, and may send the received traffic to the UE 105 via the RAN 110. Additionally, or alternatively, the SGW 410 may perform operations associated with handing off the UE 105 to and/or from an LTE network.

The PGW 415 includes one or more devices capable of providing connectivity for the UE 105 to external packet data networks (e.g., other than the depicted EPC and/or LTE network). For example, the PGW 415 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the PGW 415 may aggregate traffic received from one or more SGWs 410, and may send the aggregated traffic to the network 440. Additionally, or alternatively, the PGW 415 may receive traffic from the network 440, and may send the traffic to the UE 105 via the SGW 410 and the RAN 110. The PGW 415 may record data usage information (e.g., byte usage), and may provide the data usage information to the AAA 430.

The SCEF 420 includes one or more devices, such as one or more server devices, capable of securely exposing services and capabilities provided by the EPS. The SCEF 420 may include an interface with external applications. The SCEF 420 may provide a trigger to devices (e.g., the UE 105 and/or the secondary device 120), may retrieve device monitoring data, reachability information and roaming data, and/or the like.

The HSS 425 includes one or more devices, such as one or more server devices, capable of managing (e.g., receiving, generating, storing, processing, and/or providing) information associated with the UE 105. For example, the HSS 425 may manage subscription information associated with the UE 105, such as information that identifies a subscriber profile of a user associated with the UE 105, information that identifies services and/or applications that are accessible to the UE 105, location information associated with the UE 105, a network identifier (e.g., a network address) that identifies the UE 105, information that identifies a treatment of the UE 105 (e.g., quality of service information, a quantity of minutes allowed per time period, a quantity of data consumption allowed per time period, etc.), and/or similar information. The HSS 425 may provide this information to one or more other devices of the environment 400 to support the operations performed by those devices.

The AAA 430 includes one or more devices, such as one or more server devices, that perform authentication, authorization, and/or accounting operations for communication sessions associated with the UE 105. For example, the AAA 430 may perform authentication operations for the UE 105 and/or a user of the UE 105 (e.g., using one or more credentials), may control access, by the UE 105, to a service and/or an application (e.g., based on one or more restrictions, such as time-of-day restrictions, location restrictions, single or multiple access restrictions, read/write restrictions, etc.), may track resources consumed by the UE 105 (e.g., a quantity of voice minutes consumed, a quantity of data consumed, etc.), and/or may perform similar operations.

The ePDG 435 includes one or more devices that provides the UE 105 with access to domain services. For example, the ePDG 435 may include one or more data processing and/or traffic transfer devices, such as a gateway, a router, a modem, a switch, a firewall, a NIC, a hub, a bridge, a server device, an OADM, or any other type of device that processes and/or transfers traffic. The ePDG 435 may perform functions, such as IP address management, support for mobile IP, quality of service (QoS) enforcement, lawful intercept and security, and/or the like.

The network 440 includes one or more wired and/or wireless networks. For example, the network 440 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
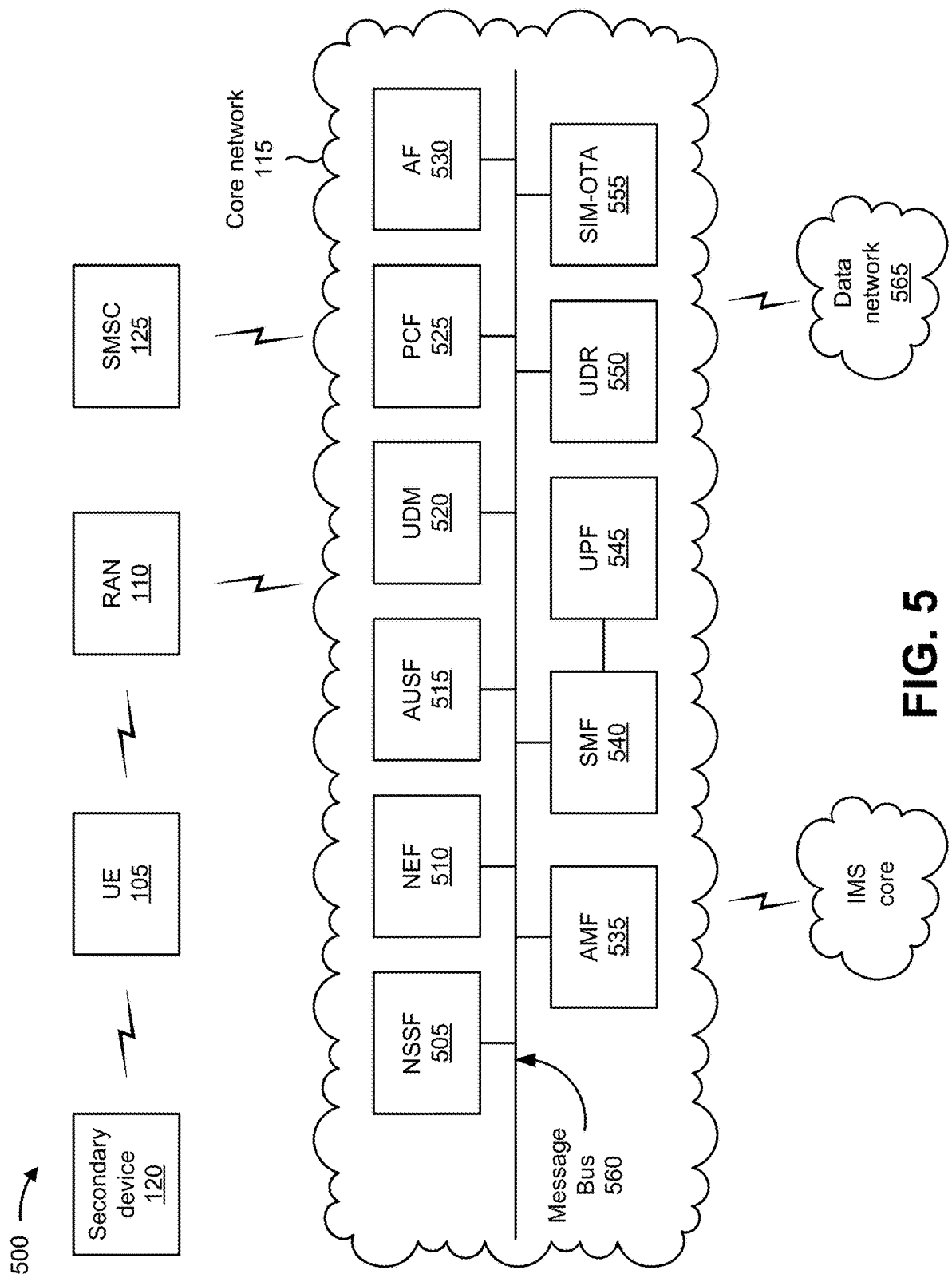

FIG. 5 is a diagram of an example environment 500 in which systems and/or methods described herein may be implemented. As shown in FIG. 5, the example environment 500 may include the UE 105, the RAN 110, the core network 115, the secondary device 120, the SMSC 125, the IMS core network, and a data network 565. Devices and/or networks of the example environment 500 may interconnect via wired connections, wireless connections, or a combination of wired and wireless connections. Details of the UE 105, the RAN 110, the secondary device 120, and the SMSC 125 are described above in connection with FIG. 4.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 5 may be an example of a service-based architecture, in some implementations, the core network 115 may be implemented as a reference-point architecture and/or a 4G core network, among other examples.

As shown in FIG. 5, the core network 115 may include a number of functional elements. The functional elements may include, for example, a network slice selection function (NSSF) 505, an NEF 510, an AUSF 515, a UDM component 520, a policy control function (PCF) 525, an application function (AF) 530, an AMF 535, a session management function (SMF) 540, a user plane function (UPF) 545, a UDR 550, and/or a SIM-OTA 555. These functional elements may be communicatively connected via a message bus 560. Each of the functional elements shown in FIG. 5 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 505 includes one or more devices that select network slice instances for the UE 105. By providing network slicing, the NSSF 505 allows an operator to deploy multiple substantially independent end-to-end networks potentially with the same infrastructure. In some implementations, each slice may be customized for different services. The NSSF 505 may determine that the UE 105 is associated with different slices depending on a device status of the UE 105 (e.g., deactivated, quarantined, and/or the like).

The NEF 510 includes one or more devices that support exposure of capabilities and/or events in the wireless telecommunications system to help other entities in the wireless telecommunications system discover network services.

The AUSF 515 includes one or more devices that act as an authentication server and support the process of authenticating the UE 105 in the wireless telecommunications system.

The UDM component 520 includes one or more devices that store user data and profiles in the wireless telecommunications system. The UDM component 520 may be used for fixed access and/or mobile access in the core network 115.

The PCF 525 includes one or more devices that provide a policy framework that incorporates network slicing, roaming, packet processing, and/or mobility management, among other examples.

The AF 530 includes one or more devices that support application influence on traffic routing, access to the NEF 510, and/or policy control, among other examples.

The AMF 535 includes one or more devices that act as a termination point for non-access stratum (NAS) signaling and/or mobility management, among other examples.

The SMF 540 includes one or more devices that support the establishment, modification, and release of communication sessions in the wireless telecommunications system. For example, the SMF 540 may configure traffic steering policies at the UPF 545 and/or may enforce user equipment IP address allocation and policies, among other examples.

The UPF 545 includes one or more devices that serve as an anchor point for intraRAT and/or interRAT mobility. The UPF 545 may apply rules to packets, such as rules pertaining to packet routing, traffic reporting, and/or handling user plane QoS, among other examples.

The UDR 550 includes one or more devices that store data grouped into distinct collections of subscription-related data, such as subscription data, policy data, structured data for exposure, application data, and/or the like. The UDR 550 may make the subscription data available, via the UDM component 520, to a number of network functions (e.g., the AUSF 515, the AMF 535, the SMF 540, and/or the like) that control the UE 105's activities within the network. The UDR 550 may make the policy data to the PCF 525. The application data may be stored in the UDR 550 by the external application function, via the NEF 510, in order to be made available to network functions that require, and are authorized to request, subscription-related data.

The SIM-OTA 555 includes one or more devices that communicate with a SIM card (e.g., provided in the UE 105 and/or the secondary device 120), download applications to a SIM card, manage a SIM card, and/or the like, without being connected physically to the SIM card.

The message bus 560 represents a communication structure for communication among the functional elements. In other words, the message bus 560 may permit communication between two or more functional elements.

The data network 565 includes one or more wired and/or wireless data networks. For example, the data network 565 may include an IMS, a PLMN, a LAN, a WAN, a MAN, a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the example environment 500 may perform one or more functions described as being performed by another set of devices of the example environment 500.

Figure 6:
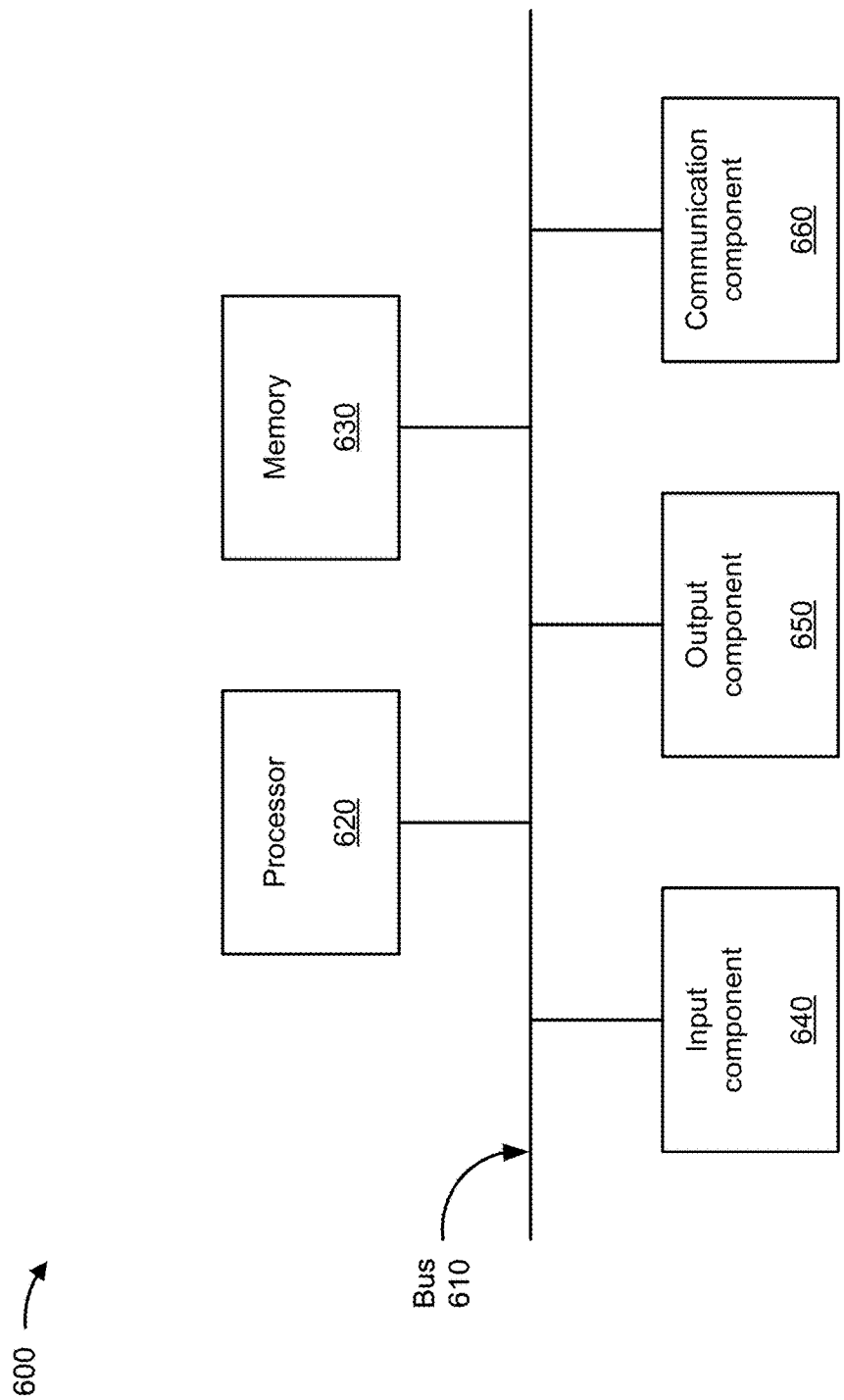
FIG. 6 is a diagram of example components of one or more devices of FIGS. 4 and 5.

FIG. 6 is a diagram of example components of a device 600, which may correspond to the UE 105, the RAN 110, the secondary device 120, the SMSC 125, the MME 405, the SGW 410, the PGW 415, the SCEF 420, the HSS 425, the AAA 430, the ePDG 435, the NSSF 505, the NEF 510, the AUSF 515, the UDM component 520, the PCF 525, the AF 530, the AMF 535, the SMF 540, the UPF 545, the UDR 550, and/or the SIM-OTA 555. In some implementations, the UE 105, the RAN 110, the secondary device 120, the SMSC 125, the MME 405, the SGW 410, the PGW 415, the SCEF 420, the HSS 425, the AAA 430, the ePDG 435, the NSSF 505, the NEF 510, the AUSF 515, the UDM component 520, the PCF 525, the AF 530, the AMF 535, the SMF 540, the UPF 545, the UDR 550, and/or the SIM-OTA 555 may include one or more devices 600 and/or one or more components of the device 600. As shown in FIG. 6, the device 600 may include a bus 610, a processor 620, a memory 630, an input component 640, an output component 650, and a communication component 660.

The bus 610 includes one or more components that enable wired and/or wireless communication among the components of the device 600. The bus 610 may couple together two or more components of FIG. 6, such as via operative coupling, communicative coupling, electronic coupling, and/or electric coupling. The processor 620 includes a central processing unit, a graphics processing unit, a microprocessor, a controller, a microcontroller, a digital signal processor, a field-programmable gate array, an application-specific integrated circuit, and/or another type of processing component. The processor 620 is implemented in hardware, firmware, or a combination of hardware and software. In some implementations, the processor 620 includes one or more processors capable of being programmed to perform one or more operations or processes described elsewhere herein.

The memory 630 includes volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. Memory 630 stores information, instructions, and/or software (e.g., one or more software applications) related to the operation of the device 600. In some implementations, the memory 630 includes one or more memories that are coupled to one or more processors (e.g., the processor 620), such as via the bus 610.

The input component 640 enables the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 enables the device 600 to provide output, such as via a display, a speaker, and/or a light-emitting diode. The communication component 660 enables the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., the memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hard-wired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
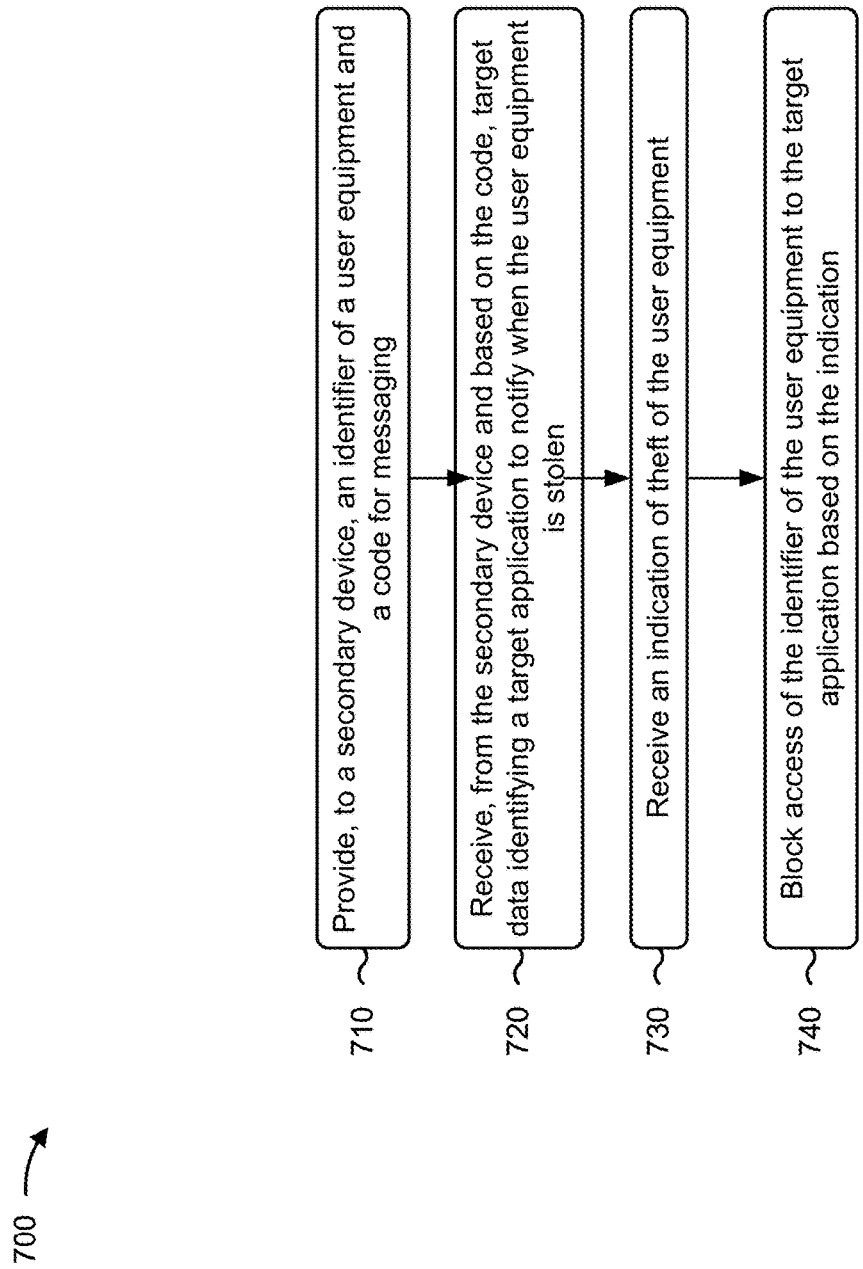
FIG. 7 is a flowchart of an example process for protecting account information associated with a stolen UE.

FIG. 7 is a flowchart of an example process 700 for protecting account information associated with a stolen UE. In some implementations, one or more process blocks of FIG. 7 may be performed by a device (e.g., the SCEF 420 or the NEF 510). In some implementations, one or more process blocks of FIG. 7 may be performed by another device or a group of devices separate from or including the device, such as a UE (e.g., the UE 105), a secondary device (e.g., the secondary device 120), an SMSC (e.g., the SMSC 125), and/or the like. Additionally, or alternatively, one or more process blocks of FIG. 7 may be performed by one or more components of the device 600, such as the processor 620, the memory 630, the input component 640, the output component 650, and/or the communication component 660.

As shown in FIG. 7, process 700 may include providing, to a secondary device, an identifier of a UE and a code for messaging (block 710). For example, the device may provide, to a secondary device, an identifier of a UE and a code for messaging, as described above. In some implementations, the secondary device is an IoT device, a key fob, or a category M1 device.

As further shown in FIG. 7, process 700 may include receiving, from the secondary device, and based on the code, target data identifying a target application to notify when the UE is stolen (block 720). For example, the device may receive, from the secondary device, and based on the code, target data identifying a target application to notify when the UE is stolen, as described above.

As further shown in FIG. 7, process 700 may include receiving an indication of theft of the UE (block 730). For example, the device may receive an indication of theft of the UE, as described above.

As further shown in FIG. 7, process 700 may include blocking access of the identifier of the UE to the target application based on the indication (block 740). For example, the device may block access of the identifier of the UE to the target application based on the indication, as described above.

In some implementations, process 700 includes associating, in a data structure, the identifier of the UE and an identifier of the secondary device. In some implementations, process 700 includes associating, in a data structure, the target data and the code for messaging. In some implementations, process 700 includes suspending the UE associated with the identifier from accessing the network based on the indication. In some implementations, process 700 includes suspending, based on the indication, activity of the UE associated with the identifier via the network or via a SMS. In some implementations, process 700 includes preventing, based on the indication, the UE from utilizing a SMS for two factor authentication for the target application.

In some implementations, process 700 includes receiving user configuration data identifying an address of the UE and a pairing of the UE and the secondary device; receiving network data and external data associated with the UE; utilizing the user configuration data, the network data, and the external data to determine safe geolocation zones and unsafe geolocation zones for the UE; utilizing the user configuration data, the network data, and the external data to configure a time interval to check a proximity of the UE and the secondary device based on the safe geolocation zones and the unsafe geolocation zones; checking the proximity of the UE and the secondary device based on the time interval; and determining, based on the proximity, whether the UE and the secondary device are separated.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In some implementations, the indication is generated based on whether the UE and the secondary device are separated. In some implementations, process 700 includes awaiting a next time interval to check the proximity based on determining that the UE and the secondary device are not separated. In some implementations, process 700 includes performing one or more actions based on determining that the UE and the secondary device are separated. In some implementations, a time interval for the safe geolocation zones is different than a time interval for the unsafe geolocation zones. In some implementations, process 700 includes comparing a geolocation of the UE and a geolocation of the secondary device to determine a proximity of the UE and the secondary device.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
providing, by a device of a network and to a secondary device, an identifier of a user equipment and a code for messaging;
receiving, by the device and from the secondary device, and based on the code, target data identifying a target application to notify when the user equipment is stolen;
receiving, by the device, an indication of theft of the user equipment; and
blocking, by the device, access of the identifier of the user equipment to the target application based on the indication.

2. The method of claim 1, further comprising:
associating, in a data structure, the identifier of the user equipment and an identifier of the secondary device.

3. The method of claim 1, further comprising:
associating, in a data structure, the target data and the code for messaging.

4. The method of claim 1, further comprising:
suspending the user equipment associated with the identifier from accessing the network based on the indication.

5. The method of claim 1, further comprising:
suspending, based on the indication, activity of the user equipment associated with the identifier via the network or via a short message service.

6. The method of claim 1, further comprising:
preventing, based on the indication, the user equipment from utilizing a short message service for two factor authentication for the target application.

7. The method of claim 1, wherein the secondary device is an Internet of Things (IoT) device, a key fob, or a category M1 device.

8. A device, comprising:
one or more processors configured to:
provide, to a secondary device, an identifier of a user equipment and a code for messaging;
receive, from the secondary device, and based on the code, target data identifying a target application to notify when the user equipment is stolen;

associate, in a data structure, the identifier of the user equipment and an identifier of the secondary device;
associate, in a data structure, the target data and the code for messaging;
receive an indication of theft of the user equipment; and
block access of the identifier of the user equipment to the target application based on the indication.

9. The device of claim 8, wherein the one or more processors are further configured to:
receive user configuration data identifying an address of the user equipment and a pairing of the user equipment and the secondary device;
receive network data and external data associated with the user equipment;
utilize the user configuration data, the network data, and the external data to determine safe geolocation zones and unsafe geolocation zones for the user equipment;
utilize the user configuration data, the network data, and the external data to configure a time interval to check a proximity of the user equipment and the secondary device based on the safe geolocation zones and the unsafe geolocation zones;
check the proximity of the user equipment and the secondary device based on the time interval; and
determine, based on the proximity, whether the user equipment and the secondary device are separated.

10. The device of claim 9, wherein the indication is generated based on whether the user equipment and the secondary device are separated.

11. The device of claim 9, wherein the one or more processors are further configured to:
await a next time interval to check the proximity based on determining that the user equipment and the secondary device are not separated.

12. The device of claim 9, wherein the one or more processors are further configured to:
perform one or more actions based on determining that the user equipment and the secondary device are separated.

13. The device of claim 9, wherein a time interval for the safe geolocation zones is different than a time interval for the unsafe geolocation zones.

14. The device of claim 9, wherein the one or more processors, to check the proximity of the user equipment and the secondary device, are configured to:
compare a geolocation of the user equipment and a geolocation of the secondary device to determine a proximity of the user equipment and the secondary device.

15. A non-transitory computer-readable medium storing a set of instructions, the set of instructions comprising:
one or more instructions that, when executed by one or more processors of a device, cause the device to:
provide, to a secondary device, an identifier of a user equipment and a code for messaging;
receive, from the secondary device, and based on the code, target data identifying a target application to notify when the user equipment is stolen;
receive an indication of theft of the user equipment; and
block access of the identifier of the user equipment to the target application based on the indication.

16. The non-transitory computer-readable medium of claim 15, wherein the one or more instructions further cause the device to:
associate, in a data structure, the identifier of the user equipment and an identifier of the secondary device; and
associate, in a data structure, the target data and the code for messaging.

17. The non-transitory computer-readable medium of claim 15, wherein the one or more instructions further cause the device to:
suspend the user equipment associated with the identifier from accessing a network based on the indication;
suspend, based on the indication, activity of the user equipment associated with the identifier via the network or via a short message service; and
prevent, based on the indication, the user equipment from utilizing the short message service for two factor authentication for the target application.

18. The non-transitory computer-readable medium of claim 15, wherein the one or more instructions further cause the device to:
receive user configuration data identifying an address of the user equipment and a pairing of the user equipment and the secondary device;
receive network data and external data associated with the user equipment;
utilize the user configuration data, the network data, and the external data to determine safe geolocation zones and unsafe geolocation zones for the user equipment;
utilize the user configuration data, the network data, and the external data to configure a time interval to check a proximity of the user equipment and the secondary device based on the safe geolocation zones and the unsafe geolocation zones;
check the proximity of the user equipment and the secondary device based on the time interval; and
determine whether the user equipment and the secondary device are separated based on the proximity.

19. The non-transitory computer-readable medium of claim 18, wherein the one or more instructions further cause the device to:
await a next time interval to check the proximity based on determining that the user equipment and the secondary device are not separated.

20. The non-transitory computer-readable medium of claim 18, wherein the one or more instructions further cause the device to:
perform one or more actions based on determining that the user equipment and the secondary device are separated.

* * * * *